United States Patent [19]

Awanohara et al.

[11] Patent Number: 5,541,678
[45] Date of Patent: Jul. 30, 1996

[54] MULTIFOCAL CONTACT LENS AND METHOD AND MOLDING DIE FOR MANUFACTURING CONTACT LENS

[75] Inventors: Yoshinori Awanohara; Toshihide Shinohara; Osamu Wada; Osamu Kamiwaki, all of Suwa, Japan

[73] Assignee: Seiko Epson Corporation, Tokyo-to, Japan

[21] Appl. No.: 108,689

[22] PCT Filed: Dec. 3, 1993

[86] PCT No.: PCT/JP92/01730

§ 371 Date: Sep. 2, 1993

§ 102(e) Date: Sep. 2, 1993

[87] PCT Pub. No.: WO93/14434

PCT Pub. Date: Jul. 22, 1993

[30] Foreign Application Priority Data

Jan. 6, 1992 [JP] Japan .................................. 4-000399
Apr. 28, 1992 [JP] Japan .................................. 4-109743

[51] Int. Cl.[6] .......................... G02C 7/04; B29D 11/00; B24B 1/00
[52] U.S. Cl. .......................... 351/161; 351/177; 425/808; 451/42
[58] Field of Search .......................... 351/160 R, 160 H, 351/161, 162, 177; 451/42; 425/808

[56] References Cited

U.S. PATENT DOCUMENTS

| | | | |
|---|---|---|---|
| 4,162,122 | 7/1979 | Cohen | 351/161 |
| 4,890,913 | 1/1990 | De Carle | 351/161 |
| 4,898,461 | 2/1990 | Portney | 351/161 |
| 5,106,180 | 4/1992 | Marie | 351/161 |

FOREIGN PATENT DOCUMENTS

| | | |
|---|---|---|
| 225098 | 6/1987 | European Pat. Off. . |
| 367513 | 5/1990 | European Pat. Off. . |
| 0445994 | 9/1991 | European Pat. Off. . |
| 3246306 | 6/1984 | Germany . |
| 59-146020 | 8/1984 | Japan . |
| 60-501426 | 8/1985 | Japan . |
| 283153 | 3/1990 | Japan . |
| 279015 | 3/1990 | Japan . |
| 2217818 | 8/1990 | Japan . |
| 8809950 | 12/1988 | WIPO . |

*Primary Examiner*—Scott J. Sugarman
*Attorney, Agent, or Firm*—Ladas & Parry

[57] ABSTRACT

In a contact lens (1) provided with a front curve (2) formed with a plurality of distance portion curved surfaces ($F_1$, $F_2$, . . . ) for seeing a distant place . . . )and a plurality of near portion curved surfaces ($N_1$, $N_2$, for seeing a near place arranged alternately and repeatedly in concentric zone shape, the distance portion curved surfaces formed at least a central zone of the front curve have respective curvature centers ($O_{F1}$, $O_{F2}$, . . . ) positioned increasing distance away from an optical axis and the front curve of the contact lens respectively, as the distance portion curved surfaces are located increasing distance away from the optical axis, and further the curvature centers of the distance portion curved surfaces are so arranged that light rays parallel do the optical axis and allowed to be incident upon the distance portion curved surfaces are focused at roughly the same point on the optical axis; and the near portion curved surfaces formed at least the central zone of the front curve have respective curvature centers ($O_{N1}$, $O_{N2}$, . . . ) positioned increasing distance away from the optical axis and decreasing distance close to the front curve of the contact lens respectively, as the near portion curved surfaces are located increasing distance away from the optical axis, and further the curvature centers of the near portion curved surfaces are so arranged that light rays parallel to the optical axis and allowed to be incident upon the near portion curved surfaces are focused at roughly the same point on the optical axis. Therefore, it is possible to realize a contact lens provided with a front curve formed with a plurality of distance portion curved surfaces and a plurality of near portion curved surfaces arranged alternately and repeatedly in concentric zone shape, from which spherical aberration can be removed.

16 Claims, 14 Drawing Sheets

MULTIFOCAL CONTACT LENS AND METHOD AND MOLDING DIE FOR MANUFACTURING CONTACT LENS

FIELD OF THE INVENTION

The present invention relates to a contact lens, and more specifically to a contact lens provided with front curves formed with a plurality of distance portion curved surfaces and a plurality of near portion curved surfaces arranged alternately and repeatedly in concentric zone shape. In addition, the present invention relates to a method of manufacturing the same.

BACKGROUND OF THE ART

A multi-focal contact lens formed with a plurality of distance portions for seeing a distant place and a plurality of near portions for seeing a near place arranged alternately in concentric zone shape has been proposed in Japanese Published Unexamined (Kokai) Patent Application No. 59-146200, for instance. When the user uses the contact lens as described above, the user can select one of the distance portions and the near portions by the user' consciousness. In other words, since the user can properly use one of the distance portions and the near portions naturally and smoothly, these contact lenses are useful for the users.

In more detail with reference to FIG. 6, the contact lens 1 as described above is provided with a front curve 2 and a base curve 3 fitted to a curved surface of the user' cornea. The front curve 2 is formed with a plurality of distance portion curved surfaces $F_1$, $F_2$, . . . and a plurality of near portion curved surfaces $N_1$, $N_2$, . . . . These distance and near portion curved surfaces are arranged alternately and repeatedly in concentric zone shape.

In the conventional contact lens of this sort, a plurality of distance portion curved surfaces $F_1$, $F_2$, . . . and a plurality of near portion curved surfaces $N_1$, $N_2$, . . . are formed as follows:

Here, a radius of curvature of the distance portion curved surface is represented by $r_F$, and a radius of curvature of the near portion curved surface is represented by $r_N$. First, a circle with a radius $r_F$ is described with a point P on an optical axis (z axis) as its center to obtain an intersection point $O_{F1}$ between the described circle and the optical axis. The obtained intersection point $O_{F1}$ is determined as a center of curvature of the distance portion curved surface $F_1$. Then, a circle with a radius $r_F$ is described with the curvature center $O_{F1}$ as its center to obtain an intersection point $P_{F1}$ between the described circle and a straight line $l_{F1}$ parallel to the optical axis. This parallel straight line $l_{F1}$ is used to determine a predetermined radial zone width of the distance portion curved surface $F_1$. Further, a circle with a radius $r_N$ is described with a point $P_{F1}$ as its center to obtain an intersection point $O_{N1}$ between the described circle and the optical axis. The obtained intersection point $O_{N1}$ is determined as a center of curvature of the near portion curved surface $N_1$. Then, a circle with a radius $r_N$ is described with the curvature center $O_{N1}$ as its center to obtain an intersection point $P_{N1}$ between the described circle and a straight line $l_{N1}$ parallel to the optical axis. This parallel straight line $l_{N1}$ is used to determine a predetermined radial zone width of the near portion curved surface $N_1$.

In the same way as above, a circle with a radius $r_F$ is described with a point $P_{N1}$ as its center to obtain an intersection point with the optical axis. The obtained intersection point is determined as a center $O_{F2}$ of the curvature of the distance portion curved surface $F_2$. With this obtained curvature center $O_{F2}$ as its center, a circle with a radius $r_F$ is described to obtain an intersection point $P_{F2}$ between the described circle and a straight line $l_{F2}$ parallel to the optical axis and thus to determine a predetermined radial zone width of the distance portion curved surface $F_2$. Further, a circle with a radius $r_N$ is described with a point $P_{F1}$ as its center to obtain an intersection point with the optical axis. The obtained intersection point is determined as a center $O_{N2}$ of the curvature of the near portion curved surface $N_2$.

FIG. 4 shows the centers $O_{F1}$, $O_{F2}$, . . . of the curvatures of the distance portion curved surfaces $F_1$, $F_2$, . . . and the centers $O_{N1}$, $O_{N2}$, . . . of the curvatures of the near portion curved surfaces $N_1$, $N_2$, . . . obtained as described above. FIG. 4 indicates that the centers $O_{F1}$, $O_{F2}$, . . . of the curvatures of the distance portion curved surfaces $F_1$, $F_2$, . . . are distributed in the z-axis direction so as to be shifted in sequence in the direction from the front curve 2 to the base curve 3. On the other hand, the centers $O_{N1}$, $O_{N2}$, . . . of the curvatures of the near portion curved surfaces $N_1$, $N_2$, . . . are distributed in the direction opposite to the z-axis direction so as to be shifted in sequence in the direction from the base curve 3 to the front curve 2.

As a result of this, as shown in FIG. 5, light rays parallel to the optical axis and incident upon the respective distance portion curved surfaces $F_1$, $F_2$, . . . are focused at different distance portion focal points $F_{F1}$, $F_{F2}$, . . . of the respective distance portion curved surfaces $F_1$, $F_2$, . . . , respectively, without focusing at a single focal point. In the same way, light rays parallel to the optical axis and incident upon the respective near portion curved surfaces $N_1$, $N_2$, . . . are focused at different near portion focal points $F_{N1}$, $F_{N2}$, . . . of the respective near portion curved surfaces $N_1$, $N_2$, . . . , respectively, without focusing at a single focal point. In other words, in the conventional contact lens, there exists spherical aberration, thus raising a problem in that it is impossible to obtain a clear image. Further, in FIG. 5, it should be noted that the arrangement sequence of the distance portion focal points $F_{F1}$, $F_{F2}$, . . . is opposite to the arrangement sequence of the centers $O_{F1}$, $O_{F2}$, . . . of the curvatures of the distance portion curved surfaces $F_1$, $F_2$, . . . , because the spherical aberration at the peripheral portions of the contact lens 1 is large.

In addition, the conventional contact lens involves another problem in that in use of the contact lens, it is impossible to obtain a desired field of vision (as wide as a normal naked eye) and a natural peripheral field of vision.

Further, in the case of the above-mentioned contact lens, since the lens is so designed and so manufactured that the optical energy incident upon the distance portions is equal to that incident upon the near portions, when the lens is used as the near portion lens (e.g., for reading or desk working), the light rays passed through the distance portions are not focused at the retina, and when used as the distance portion lens (e.g., for outdoor use), the light rays passed through the near portions are not focused at the retina. In other words, since the function of the lens formed with both the distance portions and the near portions is reduced half in indoor use or in outdoor use, thus the conventional contact lens being not easy to use.

Furthermore, in the conventional method of manufacturing the contact lens 1 provided with the front curve 2 formed with the distance portion curved surfaces and the near portion curved surfaces arranged alternately and repeatedly in concentric zone shape, since the front curve 2 is formed with the distance and near portion curved surfaces with different radii of curvatures (not a single smoothly curved surface), there exists a problem in that it is impossible to polish the surface of the contact lens uniformly including the boundary portions between the adjoining distance and near portion curved surfaces.

With these problems in mind, therefore, it is the primary object of the present invention to provide a contact lens having a front curve formed with a plurality of distance portion curved surfaces and a plurality of near portion curved surfaces arranged alternately and repeatedly in concentric zone shape without spherical aberration, while solving the problems involved in the conventional contact lens.

Further, another object of the present invention is to provide a contact lens having a desired field of vision, for instance, as wide a field of vision as the normal naked eye and further natural in the peripheral field of vision and additionally clear in eyesight.

Further, another object of the present invention is to provide a contact lens provided with the performance of almost a single focal lens but with the functions of both the distance portion lens and the near portion lens by using the lens properly according to indoor use and outdoor use.

Furthermore, the other object of the present invention is to provide a method manufacturing a contact lens which can be polished uniformly including the boundary portions between the two adjoining distance portion curved surfaces and the near portion curved surfaces.

DISCLOSURE OF THE INVENTION

To achieve the above-mentioned objects, the present invention provides a contact lens provided with a front curve formed with a plurality of distance portion curved surfaces for seeing a distant place and a plurality of near portion curved surfaces for seeing a near place arranged alternately and repeatedly in concentric zone shape, wherein the distance portion curved surfaces formed at least a central zone of the front curve have respective curvature centers positioned increasing distance away from an optical axis and the front curve of the contact lens respectively, as the distance portion curved surfaces are located increasing distance away from the optical axis, and further the curvature centers of the distance portion curved surfaces are so arranged that light rays parallel to the optical axis and allowed to be incident upon the distance portion curved surfaces are focused at roughly the same point on the optical axis; and the near portion curved surfaces formed at least the central zone of the front curve have respective curvature centers positioned increasing distance away from the optical axis and decreasing distance close to the front curve of the contact lens respectively, as the near portion curved surfaces are located increasing distance away from the optical axis, and further the curvature centers of the near portion curved surfaces are so arranged that light rays parallel to the optical axis and allowed to be incident upon the near portion curved surfaces are focused at roughly the same point on the optical axis.

Further, the present invention provides a contact lens provided with a front curve formed with a plurality of distance portion curved surfaces for seeing a distant place and a plurality of near portion curved surfaces for seeing a near place arranged alternately and repeatedly in concentric zone shape, wherein the distance portion curved surfaces formed at a central zone of the front curve have respective curvature centers positioned increasing distances away from an optical axis and the front curve of the contact lens respectively, and the distance portion curved surfaces formed radially outside the central zone of the front curve have respective curvature centers positioned increasing distance away from the optical axis and decreasing distance close to the front curve of the contact lens respectively, as the distance portion curved surfaces are located increasing distance away from the optical axis, and further the curvature centers of the distance portion curved surfaces are so arranged that light rays parallel to the optical axis and allowed to be incident upon the distance portion curved surfaces are focused at roughly the same point on the optical axis; and the near portion curved surfaces formed at the central zone of the front curve have respective curvature centers positioned increasing distance away from the optical axis and decreasing distance close to the front curve of the contact lens respectively, and the near portion curved surfaces formed radially outside the central zone of the front curve have respective curvature centers positioned increasing distances away from the optical axis and the front curve of the contact lens respectively, as the near portion curved surfaces are located increasing distance away from the optical axis, and further the curvature centers of the near portion curved surfaces are so arranged that light rays parallel to the optical axis and allowed to be incident upon the near portion curved surfaces are focused at roughly the same point on the optical axis.

Further, the respective radial zone widths of the distance portion curved surfaces change according to distance between the distance portion curved surface and an optical axis of the contact lens; and respective radial zone widths of the near portion curved surfaces change according to distance between the near portion curved surface and the optical axis of the contact lens.

In this case, the respective radial zone widths of the distance portion curved surfaces increase with increasing distance between the distance portion curved surface and the optical axis of the contact lens; and respective radial zone widths of the near portion curved surface increase with increasing distance between the near portion curved surface and the optical axis of the contact lens.

Further, the respective radial zone widths of the distance portion curved surfaces decrease with increasing distance between the distance portion curved surface and the optical axis of the contact lens; and respective radial zone widths of the near portion curved surface decrease with increasing distance between the near portion curved surface and the optical axis of the contact lens.

Further, the respective radial zone widths of the distance portion curved surfaces decrease or increase with increasing distance between the distance portion curved surface and the optical axis of the contact lens; and respective radial zone widths of the near portion curved surface increase or decrease with increasing distance between the near portion curved surface and the optical axis of the contact lens.

Further, the present invention provides a contact lens provided with a front curve formed with a plurality of distance portion curved surfaces for seeing a distant place and a plurality of near portion curved surfaces for seeing a near place arranged alternately and repeatedly in concentric zone shape, wherein respective radial zone widths of the distance portion curved surfaces are roughly equal to each other; and respective radial zone widths of the near portion curved surfaces are roughly equal to each other.

Further, present invention provides a contact lens provided with a front curve formed with a plurality of distance portion curved surfaces for seeing a distant place and a plurality of near portion curved surfaces for seeing a near place arranged alternately and repeatedly in concentric zone shape, wherein energy ratio of the distance portion curved surfaces to the near portion curved surfaces is determined on the basis of a rate according to outdoor use and indoor use. In the case of outdoor use, the distance portion curved surfaces are tinted so as to function as a sun glass.

Further, the present invention provides a method of manufacturing a contact lens provided with a front curve formed with a plurality of distance portion curved surfaces for seeing a distant place and a plurality of near portion curved surfaces for seeing a near place arranged alternately and repeatedly in concentric zone shape, wherein a soft polishing cloth is brought into pressure contact with the front curve of the contact lens by hydraulic pressure, and the front curve and the polishing cloth are both moved relative to each other to polish the front curve.

In the contact lens according to the present invention, since the distance portion curved surfaces formed at least a central zone of the front curve have respective curvature centers positioned increasing distance away from the optical axis and the front curve of the contact lens respectively, as the distance portion curved surfaces are located increasing distance away from the optical axis, and further since the curvature centers of the distance portion curved surfaces are so arranged that light rays parallel to the optical axis and allowed to be incident upon the distance portion curved surfaces are focused at roughly the same point on the optical axis, it is possible to remove the spherical aberration from the distance portion curved surfaces.

Further, since the near portion curved surfaces formed at least a central zone of the front curve have respective curvature centers positioned increasing distance away from the optical axis and decreasing distance close to the front curve of the contact lens respectively, as the near portion curved surfaces are located increasing distance away from the optical axis, and further since the curvature centers of the near portion curved surfaces are so arranged that light rays parallel to the optical axis and allowed to be incident upon the near portion curved surfaces are focused at roughly the same point on the optical axis, it is possible to remove the spherical aberration from the near portion curved surfaces.

Further, since the respective radial zone widths of the distance portion curved surfaces change according to distance between the distance portion curved surface and the optical axis of the contact lens; and further since the respective radial zone widths of the near portion curved surfaces change according to distance between the near portion curved surface and the optical axis of the contact lens, it is possible to obtain a desired field of vision roughly as wide a field as the normal naked eye, for instance and in addition to obtain a natural peripheral field of vision and a clear eyesight.

Further, as the contact lens suitable for indoor use for book reading or desk work, it is preferable to use the contact lens with a large energy ratio in the near portion curved surfaces, because a near object can be seen easily through the near portion curved surfaces and further a distant object can be seen through the distance portion curved surfaces. On the other hands, as the contact lens suitable for outdoor use for sports or car driving, it is preferable to use the contact lens with a large energy ratio in the distance portion curved surfaces, because a distant object can be seen easily through the distance portion curved surfaces and further a near object can be seen through the near portion curved surfaces. Further, when the distance portion curved surfaces are tinted, since ultraviolet rays can be cut off by the tinted distance portions, it is possible to provide a more clear eyesight through the near portions in indoor use.

Further, since a soft polishing cloth is brought into pressure contact with the front curve of the contact lens by hydraulic pressure, and further since the front curve and the polishing cloth are both moved relative to each other to polish the front curve, it is possible to allow the polishing cloth to follow the curved surfaces of the front curve softly by the hydraulic pressure, so that the curved surfaces can be polished uniformly including the boundary portions between the adjoining distance portion curved surfaces and near porion curved surfaces.

BEST MODES FOR EMBODYING THE INVENTION

A first embodiment of the contact lens according to the present invention will be described hereinbelow with reference to FIGS. 1 to 3.

Figure 3:
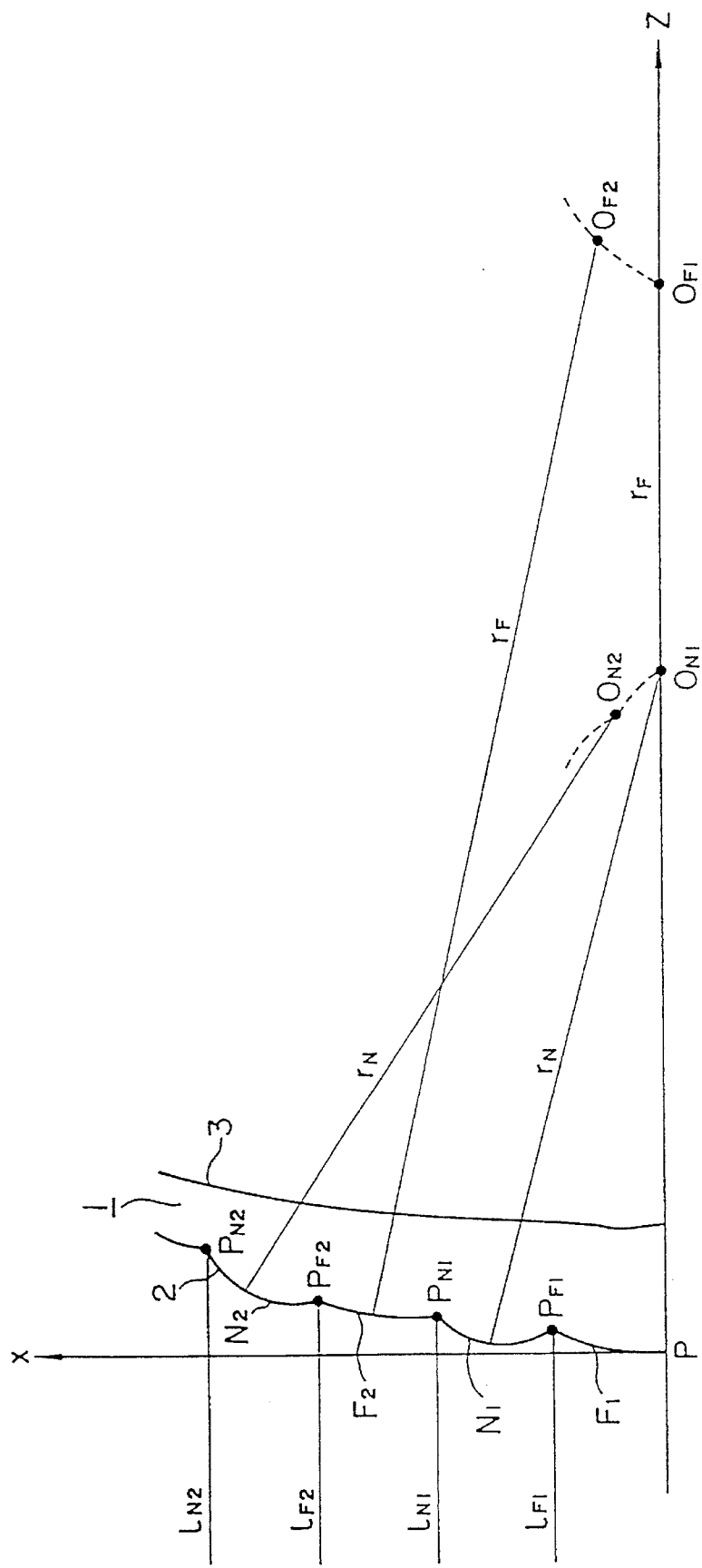
FIG. 3 is an enlarged cross-sectional view of the contact lens shown in FIG. 1.
Figure 4:
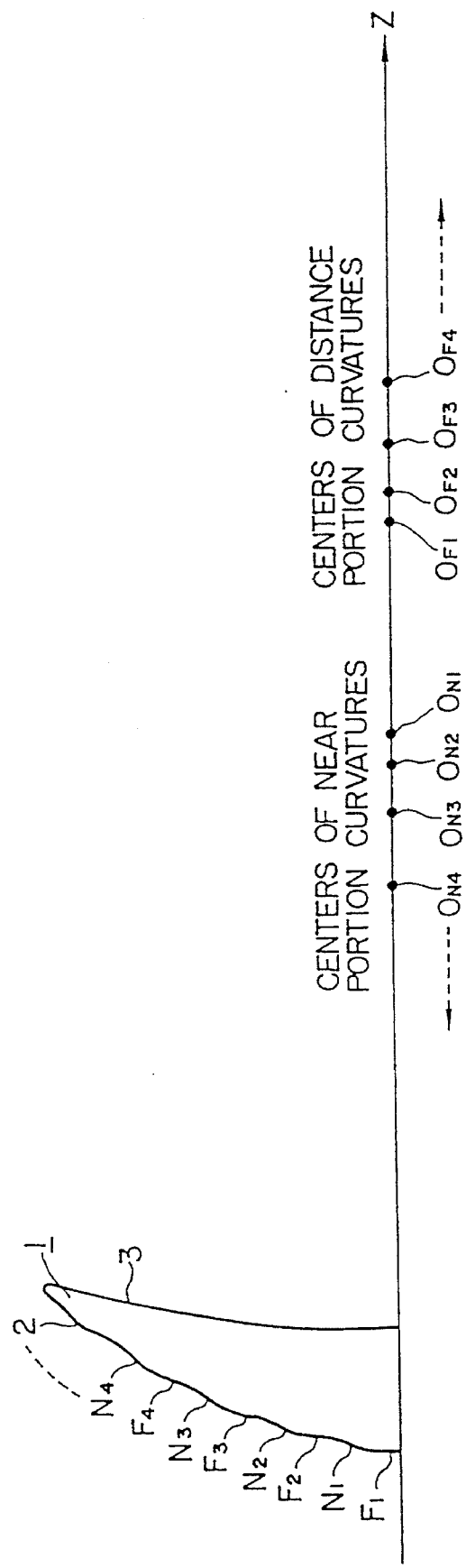
FIG. 4 is a cross-sectional view showing a conventional contact lens, in which the centers of curvatures of the distance portion curved surfaces and the near portion curved surfaces are shown.
Figure 5:
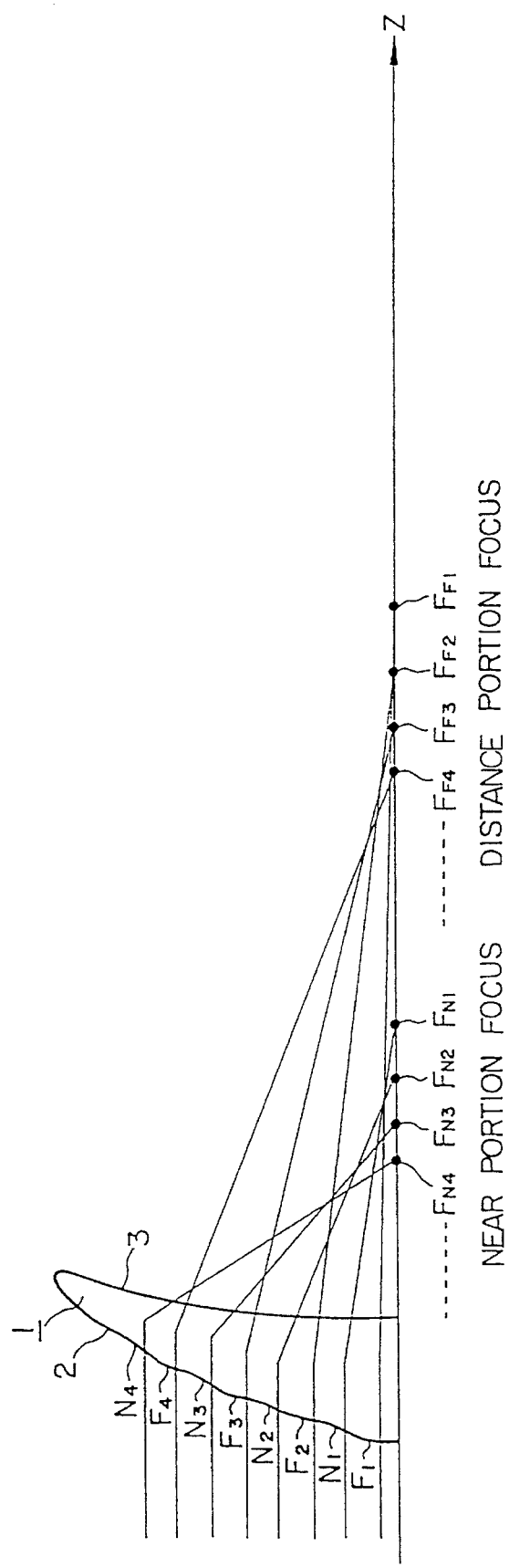
FIG. 5 is a cross-sectional view showing the distance portion focal points and the near portion focal points of the conventional contact lens.

In FIG. 3, the contact lens 1 is provided with a front curve 2 and a base curve 3. The front curve 2 is formed with a plurality of distance portion curved surfaces $F_1$, $F_2$, ... and a plurality of near portion curved surfaces $N_1$, $N_2$, .... These distance and near portion curved surfaces are arranged alternately and repeatedly in concentric zone shape. Here, the optical axis of the contact lens 1 is taken along a z axis extending from the front curve 2 to the base curve 3. Further, a vertical line passing through an apex P of the contact lens 1 is taken along an x axis perpendicular to the z axis.

The curved surface shape of the base curve 3 is determined individually according to the curved surface of a user' cornea. On the basis of the value of the determined curved surface shape of the base curve 3, the radius $r_F$ of curvature of the distance portion curved surfaces $F_1$, $F_2$, ... is determined to obtain any desired power of the distance portions, and the radius $r_N$ of curvature of the near portion curved surfaces $N_1$, $N_2$, ... is determined to obtain an added power to the distance portions as the near portions.

Figure 6:
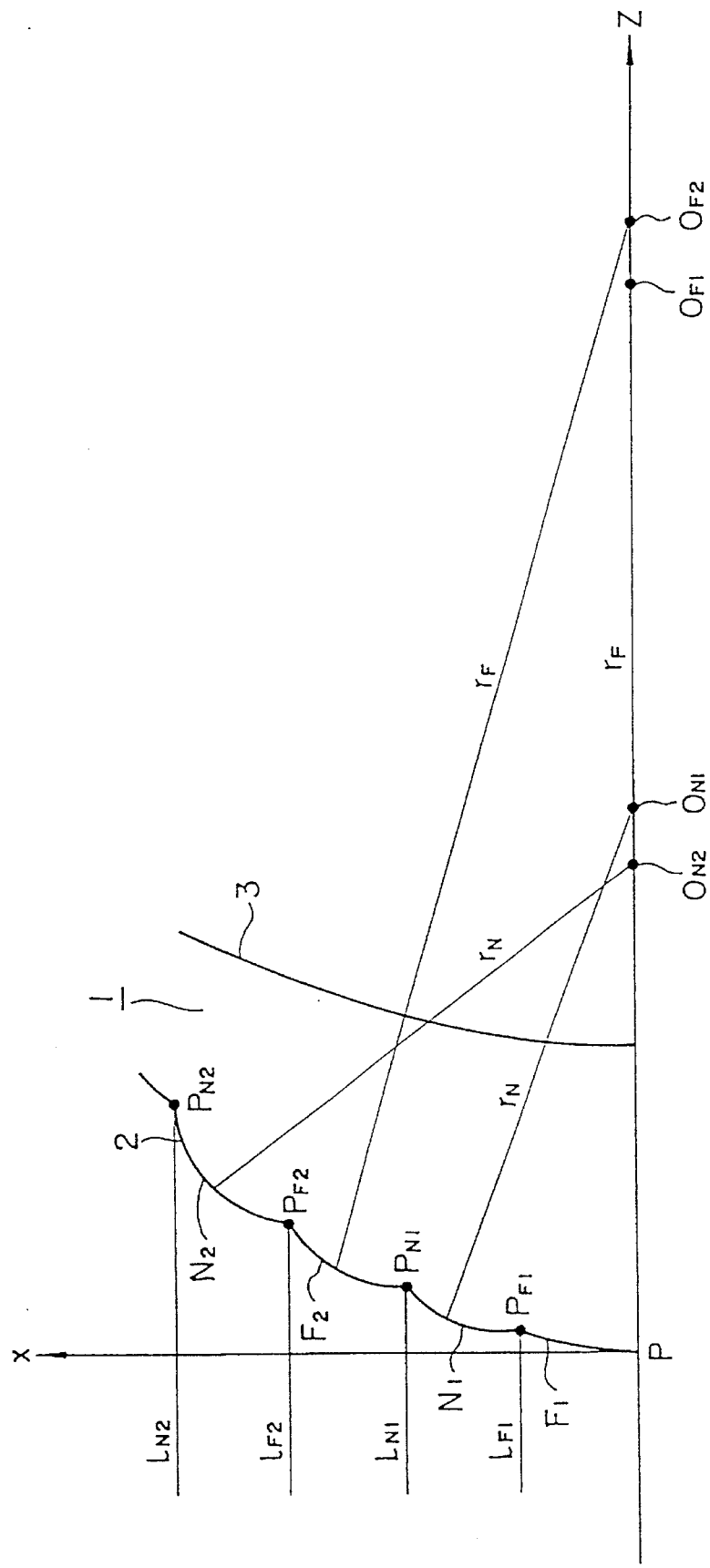
FIG. 6 is an enlarged cross-sectional view of the contact lens shown in FIG. 4.

The curvature centers $O_{F1}$, $O_{F2}$, ... of the distance portion curved surfaces $F_1$, $F_2$, ... formed at least the central zone of the front curve 2 and the curvature centers $O_{N1}$, $O_{N2}$, ... of the near portion curved surfaces $N_1$, $N_2$, ... formed at least the central zone of the front curve 2 are determined as follows:

First, as shown in FIG. 3, a position remote from the apex P by the curvature radius $r_F$ of the distance portions is taken on the optical axis as the curvature center $O_{F1}$ of the distance portion curved surface $F_1$. Then, a circle with a radius $r_F$ is described with this curvature center $O_{F1}$ as its center to obtain an intersection point $P_{F1}$ between the described circle and a straight line $l_{F1}$ parallel to the optical axis. This parallel straight line $l_{F1}$ is used to determine a predetermined radial zone width of the distance portion curved surface $F_1$. Further, a circle with a radius $r_N$ is described with a point $P_{F1}$ as its center to obtain an intersection point $O_{N1}$ between the described circle and the optical axis, as the curvature center $O_{N1}$ of the near portion curved surface $N_1$, in the same way as with the case of the conventional contact lens as shown in FIG. 6.

Figure 2:
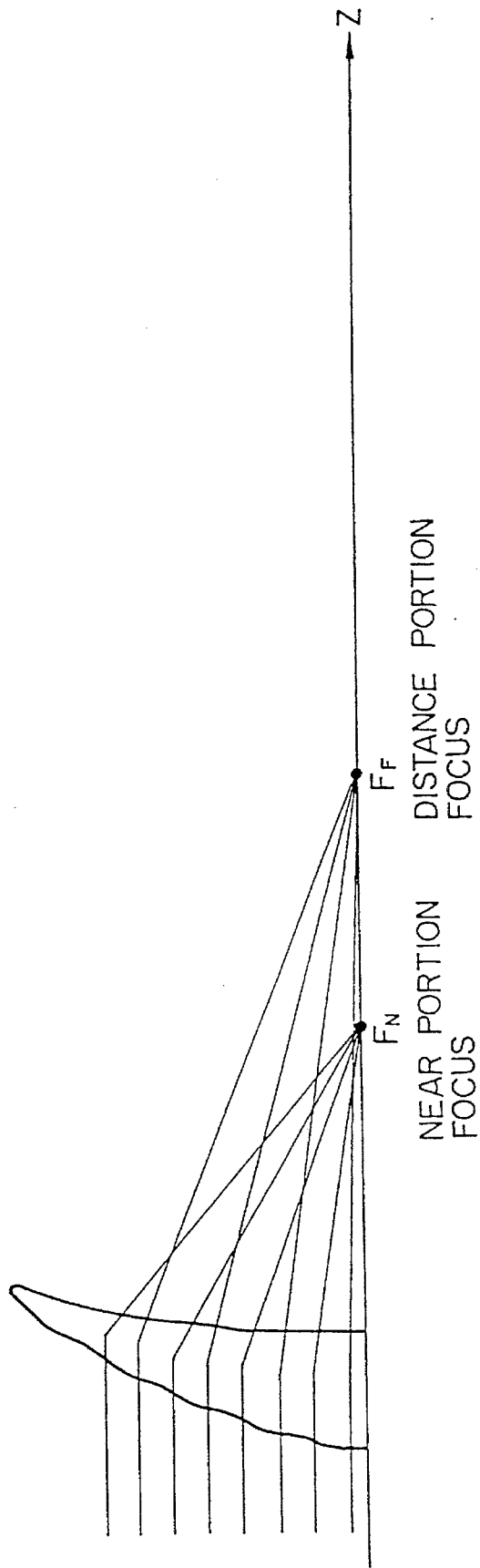
FIG. 2 is a cross-sectional view showing the distance portion focal points and the near portion focal points of the first embodiment.

Here, as shown in FIG. 2, parallel light rays are allowed to be incident upon the distance portion curved surface $F_1$, and an intersection point between the ray outgoing from the base curve 3 and the optical axis is defined as a distance portion focal point $F_F$. Further, in the same way, parallel light rays are allowed to be incident upon the near portion curved surface $F_1$, and an intersection point between the ray outgoing from the base curve 3 and the optical axis is defined as a near portion focal point $F_N$.

Further, a curvature center $O_{F2}$ of the distance portion curved surface $F_2$ is obtained as follows: A circle with a radius $r_N$ is described with the curvature center $O_{N1}$ as its center to obtain an intersection point $P_{N1}$ between the described circle and a straight line $l_{N1}$ parallel to the optical axis to determine a predetermined radial zone width of the near portion curved surface $N_1$. Further, a circle with a radius $r_F$ is described with $P_{N1}$ as its center to obtain an intersection point between the described circle and the optical axis as a candidate point of the center $O_{F2}$ of the curvature of the near portion curved surface $F_2$.

Successively, points which can satisfy the conditions required for the curvature center $O_{F2}$ are obtained in the vicinity of this obtained candidate point in accordance with the ray tracing method. In more practice, the curvature center $O_{F2}$ is obtained in accordance with the following ray tracing method: First, a circle with a radius $r_F$ is described with the candidate point of the curvature center $O_{F2}$ as its center to obtain an intersection point $P_{F2}$ between the described circle and a straight line $l_{F2}$. The shape of the distance portion curved surface $F_2$ is determined between the point $P_{N1}$ and the point $P_{F2}$.

Further, the distance portion curved surface $F_2$ extending between the points $P_{N1}$ and $P_{F2}$ is rotated slightly counterclockwise in FIG. 3 with the point $P_{N1}$ as its center. Parallel light rays in a range between the two straight lines $l_{N1}$ and $l_{F2}$ are allowed to be incident upon the distance portion curved surface $F_2$ to obtain an intersection position between the light outgoing from the base curve 3 and optical axis.

Here, if the intersection position between the light rays outgoing from the base curve 3 and the optical axis is located at a position remote from the distance portion focal point $F_F$ in the negative z direction, the distance portion curved surface $F_2$ is further rotated counterclockwise with the point $P_{N1}$ as its center.

On the other hand, if the intersection position between the light rays outgoing from the base curve 3 and the optical axis is located at a position remote from the distance portion focal point $F_F$ in the positive z direction, the distance portion curved surface $F_2$ is rotated clockwise with the point $P_{N1}$ as its center.

As described above, the rotation position of the distance portion curved surface $F_2$ about the point $P_{N1}$ is determined in such a way that the parallel light rays allowed to be incident upon the front curve 2 are passed through the distance portion focal point $F_F$. In this case, the curvature center of the distance portion curved surface $F_2$ thus obtained becomes the curvature center $O_{F2}$ required to be obtained.

The method of obtained the curvature center $O_{N2}$ of the near portion curved surface $N_2$ will be described hereinbelow.

First, a circle with a radius $r_N$ is described with the point $P_{F2}$ of the distance portion curved surface $F_2$ determined as above as its center, to obtain an intersection point between the described circle and the optical axis as a first candidate point. A circle with a radius $r_N$ is described with this candidate point as its center to obtain an intersection point $P_{N2}$ between the described circle and a straight line $l_{N2}$. The shape of the near portion curved surface $N_2$ is determined between the point $P_{F2}$ and the point $P_{N2}$.

Further, in the same way as with the case where the curvature center $O_{F2}$ is obtained, the near portion curved surface $N_2$ extending between the points $P_{F2}$ and $P_{N2}$ is rotated slightly counterclockwise in FIG. 3 with the point $P_{F1}$ as its center. Parallel light rays in a range between the two straight lines $l_{F2}$ and $l_{N2}$ are allowed to be incident upon the near portion curved surface $N_2$ to obtain an intersection position between the light outgoing from the base curve 3 and optical axis.

Here, if the intersection position between the light rays outgoing from the base curve 3 and the optical axis is located at a position remote from the near portion focal point $F_N$ in the negative z direction, the near portion curved surface $N_2$ is further rotated counterclockwise with the point $P_{F2}$ as its center.

On the other hand, if the intersection position between the light rays outgoing from the base curve 3 and the optical axis is located at a position remote from the distance portion focal point $F_N$ in the positive z direction, the near portion curved surface $N_2$ is rotated clockwise with the point $P_{F2}$ as its center.

As described above, the rotation position of the near portion curved surface $N_2$ about the point $P_{F2}$ is determined in such a way that the parallel light rays allowed to be incident upon the near portion curved surface $N_2$ are passed through the near portion focal point $F_N$. In this case, the curvature center of the near portion curved surface $N_2$ thus obtained becomes the curvature center $O_{N2}$ required to be obtained.

In the same way as above, the other remaining curvature centers $O_{F3}, O_{F4}, \ldots$ and $O_{N3}, O_{N4}, \ldots$ can be obtained.

Figure 1:
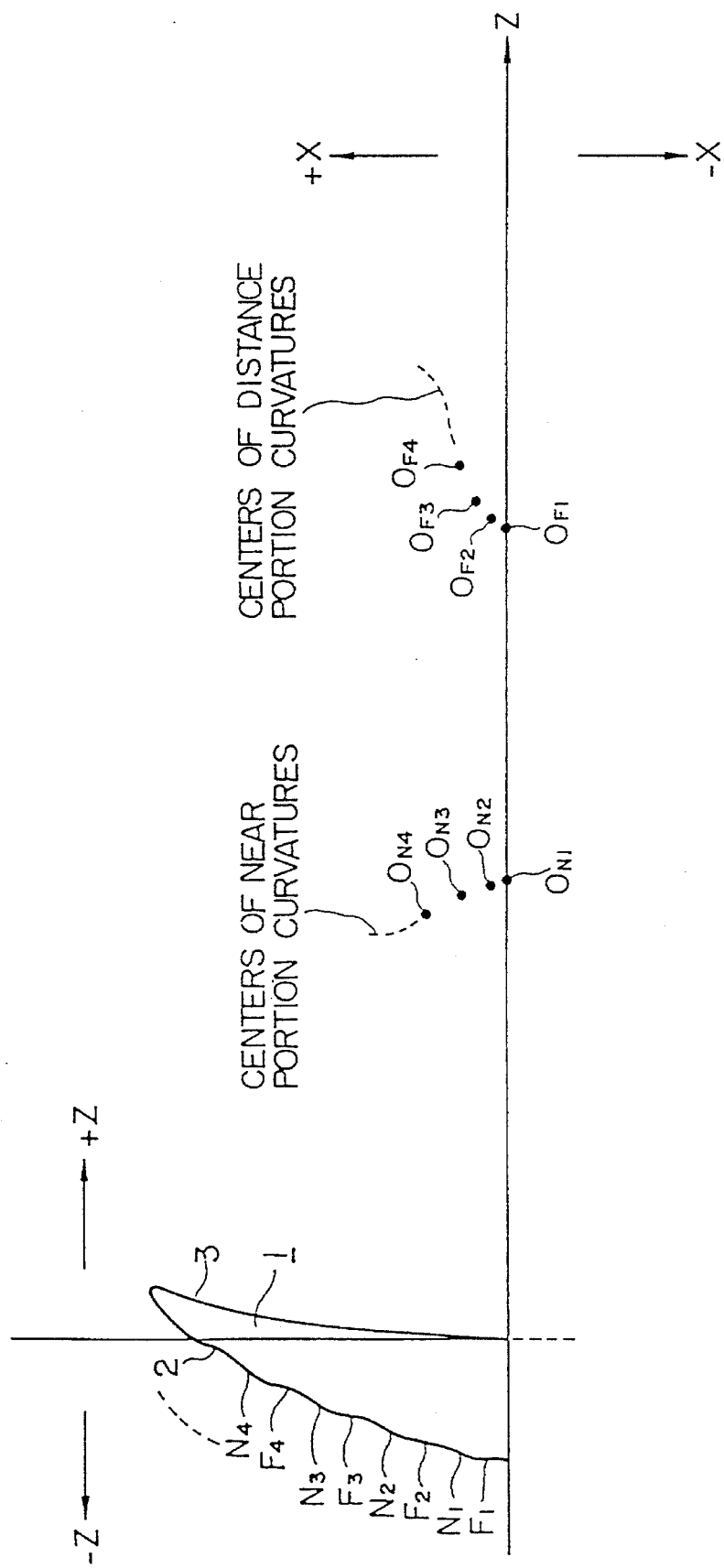
FIG. 1 is a cross-sectional view showing a first embodiment of the contact lens according to the present invention, in which the centers of curvatures of the distance portion curved surfaces and the near portion curved surfaces are shown.

FIG. 1 shows the curvature centers $O_{F1}, O_{F2}, \ldots$ of the distance portions and the curvature centers $O_{N1}, O_{N2}, \ldots$ of the near portions, respectively.

FIG. 1 indicates that the curvature centers $O_{F1}, O_{F2}, \ldots$ of the distance portions formed at least the central zone of the front curve are positioned increasing distance away from the optical axis and additionally away from the front curve 2, as the distance portion curved surfaces are located increasing distance away from the optical axis. In the same way, FIG. 1 indicates that the curvature centers $O_{N1}, O_{N2}, \ldots$ of the near portions formed at least the central zone of the front curve are positioned increasing distance away from the optical axis but decreasing distance close to the front curve 2, as the near portion curved surfaces are located increasing distance away from the optical axis.

In addition, FIG. 2 indicates that the parallel light rays incident upon the respective distance portion curved surfaces $F_1, F_2, \ldots$ are focused at the distance portion focal point $F_F$, and the parallel light rays incident upon the respective near portion curved surfaces $N_1, N_2, \ldots$ are focused at the near portion focal point $F_N$, without producing the spherical aberration.

In the case of the contact lens 1 shown in FIGS. 1 to 3, the respective distance portion curved surfaces $F_1, F_2, \ldots$ and the respective near portion curved surfaces $N_1, N_2, \ldots$ are both formed as plus (convex) lenses in relation to the base curve 3. Without being limited thereto, however, the above-mentioned method can be applied to the cases where the distance portions are formed as minus (concave) lenses and the near portions are formed as plus (convex) lenses or where the distance and near portions are both formed as minus (concave) lenses.

However, in the case where the distance portions are formed as minus lenses, the inclination direction of the respective distance portion curved surfaces $F_2, F_3, \ldots$ are rotated in the counterclockwise direction about the points $P_{N1}, P_{N2}, \ldots$, in comparison with the conventional contact lens as shown in FIG. 6. In contrast with this, in the case of the distance portions of minus lenses, the respective distance portion curved surfaces $F_2, F_3, \ldots$ are rotated in the clockwise direction about the points $P_{N1}, P_{N2}$. In the same way as above, in the case of the near portions of minus lenses, the inclination direction of the curved surfaces $N_2$, $N_3, \ldots$ becomes opposite to that of the near portions of plus lenses.

Further, with respect to the distance portion curved surfaces formed outside the central zone of the front curve 2, it is possible to obtain the respective curvature centers in accordance with the ray tracing method, in such a way that the spherical aberration can be eliminated, in the same way as with the case of the distance portion curved surfaces $F_2$, $F_3, \ldots$ formed at the central zone of the front curve 2. These curvature centers are positioned increasing distance away from the optical axis but decreasing distance close to the front curve 2, as the distance portion curved surfaces are located increasing distance away from the optical axis.

Further, with respect to the near portion curved surfaces formed outside the central zone of the front curve 2, it is possible to obtain the respective curvature centers in accordance with the ray tracing method, in such a way that the spherical aberration can be eliminated in the same way as with the case of the near portion curved surfaces $N_2, N_3, \ldots$ formed at the central zone of the front curve 2. These curvature centers are positioned increasing distance away from the optical axis and additionally increasing distance away from the front curve 2, as the near portion curved surfaces are located increasing distance away from the optical axis.

The above-mentioned embodiment will be described in more practical way hereinbelow with the use of numerical values.

The contact lens 1 used in this embodiment is a soft contact lens of moisture content type, whose base curve 3 is 8.6 mm in moisture content state. Further, the respective radial zone widths of the distance and near portions are 0.3 mm in non-moisture content state.

(1) EXAMPLE 1

When a contact lens such that the power of the distance portion lenses is +1.00 D (diopter) and the added power of the near portion lenses is +2.00 D in moisture content state is required, the curvature of radius of the distance portions is 7.2489 mm and that of the near portions is 6.9788 mm in non-moisture content state during the manufacturing process. Here, when the zones are defined in sequence beginning from the center of the contact lens 1 in the radially outward direction as a first distance zone, a first near zone, a second distance zone, a second near zone, ..., the change in the curvature centers of the respective zones can be shown as listed in Tables 1 and 2 below.

TABLE 1

| | CURVATURE CENTER | |
|---|---|---|
| | X COORDINATE | Z COORDINATE |
| 1st DIST ZONE | 0.0000 mm | 7.1061 mm |
| 2nd DIST ZONE | 0.0001 | 7.1068 |
| 3rd DIST ZONE | 0.0008 | 7.1086 |
| 4th DIST ZONE | 0.0026 | 7.1117 |
| 5th DIST ZONE | 0.0059 | 7.1165 |

TABLE 2

| | CURVATURE CENTER | |
|---|---|---|
| | X COORDINATE | Z COORDINATE |
| 1st NEAR ZONE | 0.0001 mm | 6.8357 mm |
| 2nd NEAR ZONE | 0.0014 | 6.8347 |
| 3rd NEAR ZONE | 0.0059 | 6.8334 |
| 4th NEAR ZONE | 0.0148 | 6.8328 |
| 5th NEAR ZONE | 0.0297 | 6.8345 |

Table 1 indicates that the z coordinate of the distance portions increase monotonously from the first to fifth zones. Further, Table 2 indicates that the z coordinate of the near portions increase monotonously from the first to fourth zones, but begins to increase from the fourth to fifth zones. Accordingly, in the near portions, the first to fourth zones constitute the central zone of the front curve.

(2) EXAMPLE 2

When a contact lens such that the power of the distance portion lenses is +5.00 D (diopter) and the added power of the near portion lenses is +5.00 D in moisture content state is required, the curvature of radius of the distance portions is 6.7549 mm and that of the near portions is 6.1966 mm in non-moisture content state during the manufacturing process. Here, when the zones are defined in sequence beginning from the center of the contact lens 1 in the radially outward direction as a first distance zone, a first near zone, a second distance zone, a second near zone, . . . , the change in the curvature centers of the respective zones can be shown as listed in Tables 3 and 4 below.

TABLE 3

| | CURVATURE CENTER | |
|---|---|---|
| | X COORDINATE | Z COORDINATE |
| 1st DIST ZONE | 0.0000 mm | 6.5542 mm |
| 2nd DIST ZONE | 0.0007 | 6.5561 |
| 3rd DIST ZONE | 0.0043 | 6.5609 |
| 4th DIST ZONE | 0.0128 | 6.5697 |
| 5th DIST ZONE | 0.0282 | 6.5843 |

TABLE 4

| | CURVATURE CENTER | |
|---|---|---|
| | X COORDINATE | Z COORDINATE |
| 1st NEAR ZONE | 0.0003 mm | 5.9953 mm |
| 2nd NEAR ZONE | 0.0048 | 5.9929 |
| 3rd NEAR ZONE | 0.0189 | 5.9906 |
| 4th NEAR ZONE | 0.0472 | 5.9920 |
| 5th NEAR ZONE | 0.0890 | 5.9999 |

Table 3 indicates that the z coordinate of the distance portions increase monotonously from the first to fifth zones. Further, Table 4 indicates that the z coordinate of the near portions increase monotonously from the first to third zones, but begins to increase from the third to fourth zones. Accordingly, in the near portions, the first to third zones constitute the central zone of the front curve.

(2) EXAMPLE 3

When a contact lens such that the power of the distance portion lenses is −3.00 D (diopter) and the added power of the near portion lenses is +2.00 D in moisture content state is required, the curvature of radius of the distance portions is 7.8218 mm and that of the near portions is 7.5082 mm in non-moisture content state during the manufacturing process.

Here, when the zones are defined in sequence beginning from the center of the contact lens 1 in the radially outward direction as a first distance zone, a first near zone, a second distance zone, a second near zone, . . . , the change in the curvature centers of the respective zones can be shown as listed in Tables 5 and 6 below.

TABLE 5

| | CURVATURE CENTER | |
|---|---|---|
| | X COORDINATE | Z COORDINATE |
| 1st DIST ZONE | 0.0000 mm | 7.7495 mm |
| 2nd DIST ZONE | −0.0005 | 7.7502 |
| 3rd DIST ZONE | −0.0032 | 7.7515 |
| 4th DIST ZONE | −0.0098 | 7.7527 |
| 5th DIST ZONE | −0.0219 | 7.7526 |

TABLE 6

| | CURVATURE CENTER | |
|---|---|---|
| | X COORDINATE | Z COORDINATE |
| 1st NEAR ZONE | 0.0003 mm | 7.4356 mm |
| 2nd NEAR ZONE | −0.0004 | 7.4344 |
| 3rd NEAR ZONE | −0.0015 | 7.4320 |
| 4th NEAR ZONE | −0.0040 | 7.4282 |
| 5th NEAR ZONE | −0.0080 | 7.4226 |

Table 5 indicates that the z coordinate of the distance portions increase monotonously from the first to fourth zones, and begins to decrease from the fourth to fifth zones. Accordingly, in the distance portions, the first to fourth zones constitute the central zone of the front curve. Further, Table 6 indicates that the z coordinate of the near portions increase monotonously from the first to fifth zones.

Further, the above-mentioned numerical values are listed only by way of examples, and therefore the contact lenses of the present invention are not limited to these numerical values.

In the first embodiment as described above, the distance portion curved surfaces of at least the central zone of the front curve are so formed as to have the curvature centers positioned increasing distance away from the optical axis and further the front curve, as the distant portions curved surfaces are located increasing distance away from the optical axis. Further, the near portion curved surfaces of at least the central zone of the front curve are so formed as to have the curvature centers positioned increasing distance away from the optical axis but decreasing distance close to the front curve, as the near portions curved surfaces are located increasing distance away from the optical axis. Accordingly, it is possible to eliminate the spherical aberration of the contact lens 1. As a result of this, it is possible to realize a contact lens formed with both distance and near portions through which more clear eyesight can be obtained, as compared with the conventional contact lens.

Further, in the case of the contact lens formed with plus distance and near portions, since the respective distance portion curved surfaces $F_1, F_2, \ldots$ and the respective near portion curved surfaces $N_1, N_2, \ldots$ are rotated in the counterclockwise direction, it is possible to reduce the thickness of the contact lens 1. As a result, it is possible to improve the user' fitting feeling to the contact lens 1.

However, in the case of the contact lens formed with minus distance and near portions, since the respective distance portion curved surfaces $F_1, F_2, \ldots$ and the respective near portion curved surfaces $N_1, N_2, \ldots$ are rotated in the clockwise direction, the effect of reducing the thickness of the contact lens 1 is small, as compared with the case of the contact lens formed with plus distance and near portions.

Further, in the above-mentioned embodiment, the contact lens formed with the alternately arranged distance and near portion curved surfaces is described by way of example. Without being limited thereto, in the present invention, it is also possible to further form concentric zone-shaped intermediate portion curved surfaces (for seeing the intermediate distance between the distant and near places) between the distance portion curved surfaces and the near portion curved surfaces, respectively or in the close vicinity of the distance or near portion curved surfaces, respectively.

Further, in the above-mentioned embodiment, although only a single curvature radius is used for the distance or near portion curved surfaces, it is possible to use of a plurality of different radii of curvatures for the distance and near portion curved surfaces, respectively.

Further, it is also possible to eliminate the spherical aberration by appropriately selecting the respective curvature radii of the distance portion curved surfaces $F_1$, $F_2$, . . . and the near portion curved surfaces $N_1$, $N_2$, . . . , under the conditions that the respective curvature centers $O_{F1}$, $O_{F2}$, . . . of the distance portions and the curvature centers $O_{N1}$, $O_{N2}$, . . . of the near portions are distributed on the optical axis.

In addition, it is also possible to obtain the contact lens provided with the front curve formed with the distance and near portion curved surfaces arranged alternately and repeatedly in concentric zone shape by setting predetermined refractive indices to the respective concentric zones, without determining the geometrical shapes of the contact lens 1. In this case, it is also possible to distribute predetermined refractive indices to the respective concentric zones in such a way that the spherical aberration of the contact lens 1 can be eliminated, by injecting irons thereinto, for instance.

The other (from a second to a fifth) embodiments will be described hereinbelow with reference to FIGS. 7 to 13, which are all improved so as to provide broader peripheral field of vision and more clear eyesight. Further, in these embodiments, the contact lens according to the present invention is further improved so as to be used in more comfortable way according to the environment in which the contact lens is used, under consideration that the diameter of pupils vary according to the environment where of the contact lenses are used. This is because when seeing an object, the diameter of the pupil changes according to a distance to the object or the quantity of light allowed to be incident upon the pupil (i.g., brightness).

Figure 7:
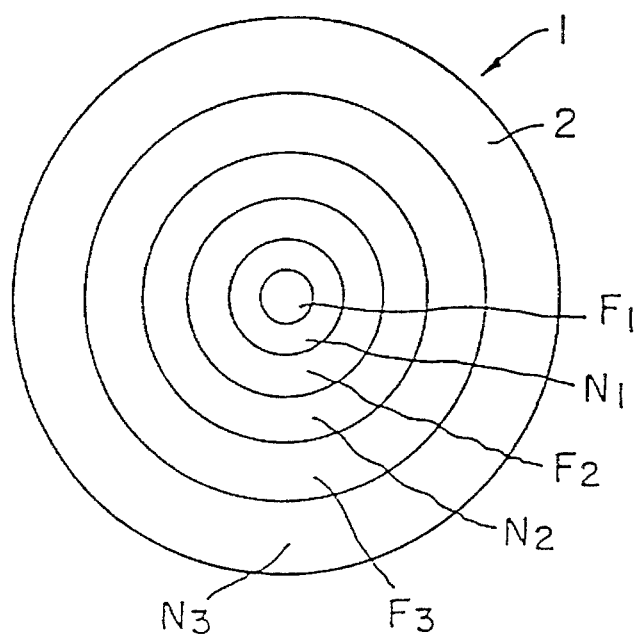
FIG. 7 is a plane view showing a second embodiment of the contact lens according to the present invention.

A second embodiment will be first described with reference to FIG. 7. In the drawing, the contact lens 1 has a front curve 2 formed with a plurality of distance portion curved surfaces $F_1$, $F_2$, . . . and a plurality of near portion curved surfaces $N_1$, $N_2$, . . . arranged alternately and repeatedly in concentric zone shape.

The radial width of each of the concentric zones of the respective distance portion curved surfaces $F_1$, $F_2$, . . . increases with increasing distance away from the optical axis. In the same way, the radial width of each of the concentric zones of the respective near portion curved surfaces $N_1$, $N_2$, . . . also increases with increasing distance away from the optical axis.

Table 7 lists practical numerical values, in which the radial widths of the respective concentric zones increase beginning from the radial width (i.e., a radius of the central circle) of the innermost central zone (distance portion curved surface $F_1$) in the radial direction in geometrical progression manner at a determined change rate of radial width. In practice, it is preferable that the radial width in the innermost central zone lies within a range from 0.1 mm to 0.5 mm.

TABLE 7

| WIDTH IN CENTRAL ZONE | CHANGE RATE IN ZONE WIDTH |
| --- | --- |
| 0.1 mm | 1.01 to 2.7 |
| 0.3 | 1.01 to 1.5 |
| 0.5 | 1.01 to 1.3 |

Here, the radial widths of the concentric zones of the respective distance portion curved surfaces $F_1$, $F_2$, and the near portion curved surfaces $N_1$, $N_2$, . . . are determined by the intersection points $P_{F1}$, $P_{N2}$, $P_{F2}$, $P_{N2}$ . . . between the straight lines $l_{F1}$, $l_{N1}$, $l_{F2}$, $l_{N2}$, . . . parallel to the z axis and the front curve 2, as shown in FIG. 3. In more detail, the radial width of the distance portion curved surface $F_1$ is a length between the apex point P on the curved surface and the intersection point $P_{F1}$. In the same way, the radial width of the distance portion curved surface $F_2$ is a length between the intersection point $P_{F1}$ on the curved surface and the intersection point $P_{N1}$. The other radial widths can be defined in the same way. Further, since the respective radial widths are very narrow, it is possible to determine the radial width of the distance portion curved surface $F_2$ (between the intersection points $P_{F1}$ and $P_{N1}$ in the curved surface) to be roughly equal to the length of the straight line between the apex point P and the intersection point $P_{F1}$ or further the length between the straight lines $l_{F1}$ and $l_{N1}$, for instance.

According to the second embodiment, since the radial width is widened at the peripheral portion of the contact lens 1, it is possible to obtain a broader peripheral field of vision.

Figure 8:
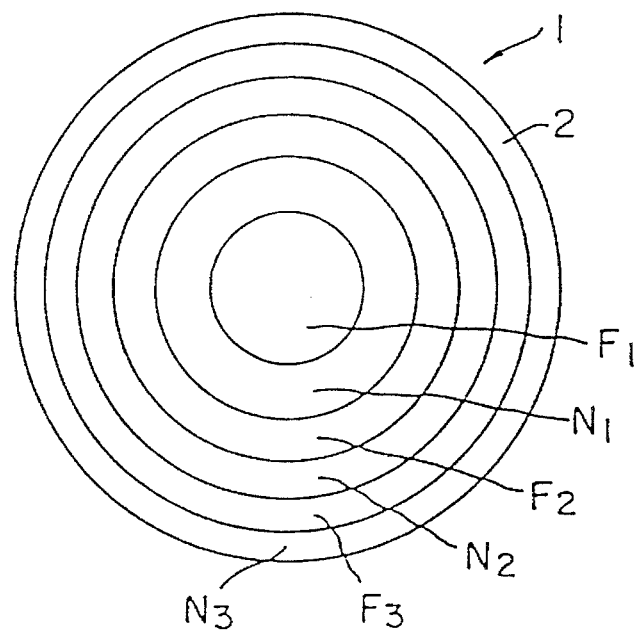
FIG. 8 is a plane view showing a third embodiment of the contact lens according to the present invention.

A third embodiment of the present invention will be described hereinbelow with reference to FIG. 8.

In the drawing, the radial width of each of the concentric zones of the respective distance portion curved surfaces $F_1$, $F_2$, . . . decreases with increasing distance from the optical axis. In the same way, the radial width of each of the concentric zones of the respective near portion curved surfaces $N_1$, $N_2$, . . . also decreases with increasing distance from the optical axis.

Table 8 lists practical numerical values, in which the radial widths of the respective concentric zones decrease beginning from the radial width (i.e., a radius of the central circle) of the innermost central zone (distance portion curved surface $F_1$) in the radial direction in geometrical progression manner at a given radial width change rate. In practice, it is preferable that the radial width in the innermost central zone lies within a range from 0.2 mm to 1.4 mm.

TABLE 8

| WIDTH IN CENTRAL ZONE | CHANGE RATE IN ZONE WIDTH |
| --- | --- |
| 0.2 mm | 0.99 to 0.93 |
| 0.5 | 0.99 to 0.83 |
| 1.0 | 0.85 to 0.67 |

According to the third embodiment, since the radial width is widened at the central zone of the contact lens 1, it is possible to obtain a field of more clear vision.

Figure 9:
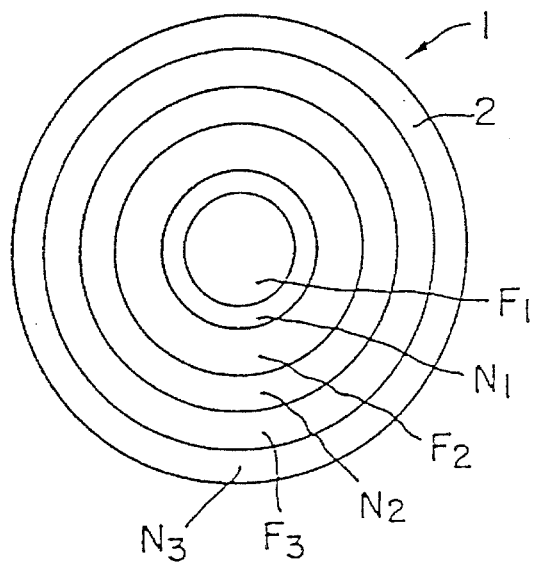
FIG. 9 is a plane view showing a fourth embodiment of the contact lens according to the present invention.

A fourth embodiment of the present invention will be described hereinbelow with reference to FIG. 9. In the drawing, the radial width of each of the concentric zones of the respective distance portion curved surfaces $F_1$, $F_2$, . . .

decreases with increasing distance from the optical axis. On the other hand, the radial width of each of the concentric zones of the respective near portion curved surfaces $N_1$, $N_2$, ... increases with increasing distance from the optical axis. As the practical numerical values, the near portions are determined in accordance with the values as listed in Table 7 and the distance portions are determined in accordance with the values as listed in Table 8, for instance.

Figure 13:
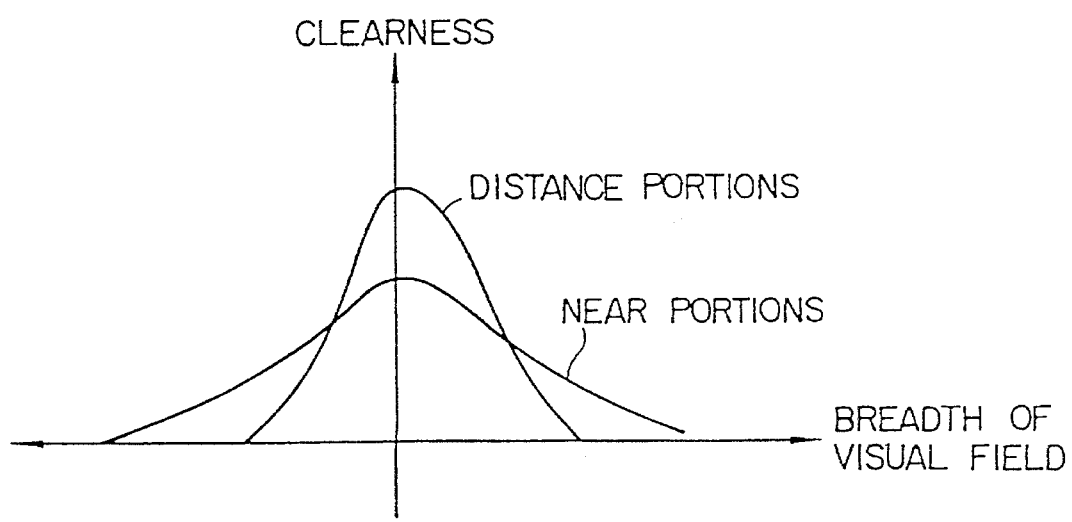
FIG. 13 is a graphical representation showing the relationship between the breadth of the field of vision and the clearness (legibility) of both the distance portions and the near portions of the fourth embodiment.

According to the fourth embodiment, it is possible to obtain a contact lens provided with the distance portions clear in the eyesight and the near portions broad in the peripheral field of vision. FIG. 13 represents the conceptual relationship between the breadth of the field of vision and the clearness of the eyesight in comparison between the distance portions and the near portions.

Figure 10:
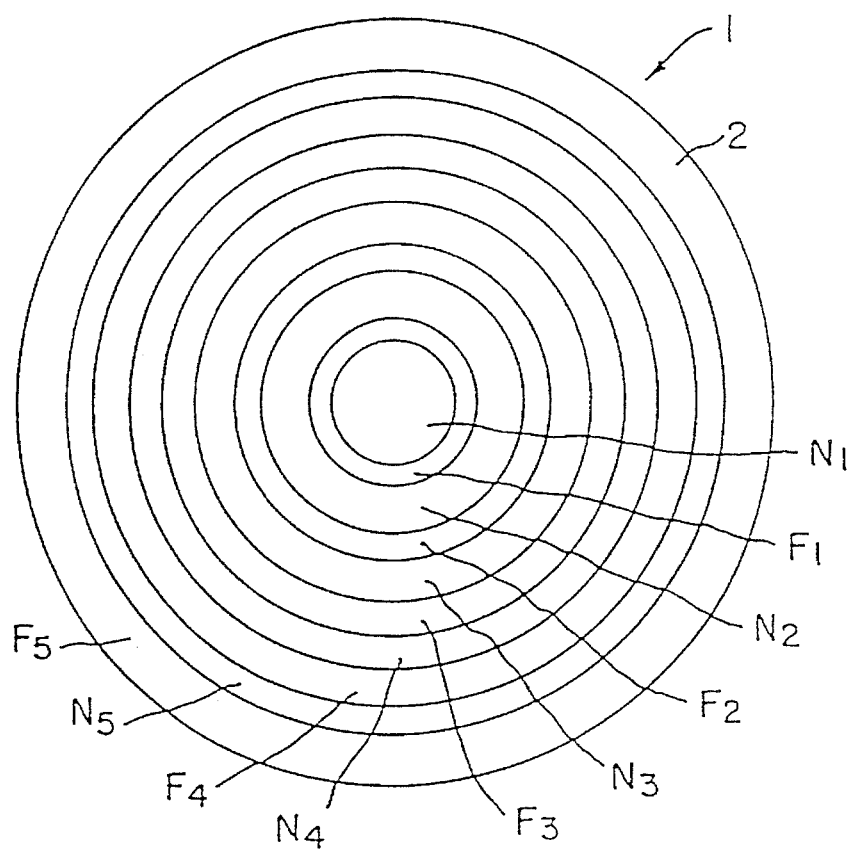
FIG. 10 is a plane view showing a modification of the fourth embodiment of the contact lens according to the present invention.

Further, as shown in FIG. 10, it is also possible to form the contact lens in such a way that the radial width of each of the concentric zones of the respective distance portion curved surfaces $F_1$, $F_2$, ... increases with increasing distance from the optical axis, and the radial width of each of the concentric zones of the respective near portion curved surfaces $N_1$, $N_2$, ... decreases with increasing distance from the optical axis. In this case, it is possible to obtain a contact lens provided with the near portions clear in the eyesight and the distance portions broad in the peripheral field of vision. However, the conceptual relationship between the breadth of the field of vision and the clearness of the eyesight of both the distance portions and the near portions becomes opposite to that as shown in FIG. 13.

When seeing an object, the diameter of the pupil changes according to the distance to the object and the brightness (i.e., the quantity of light incident upon the pupil). That is, when seeing a distant object outdoors, the pupil diameter increases; and when seeing a near object indoors, the pupil diameter decreases. Further, the pupil diameter becomes large in a dark place but small in a bright place.

The circular zone of the curved surfaces available for the pupil lies in an area of the curved surfaces $F_1$, $N_1$, $F_2$, $N_2$, ... included in a circle described with a pupil center as its center. Therefore, when the pupil diameter changes, the circular zone of the curved surfaces also changes. In the case of the contact lens as shown in FIG. 9 or 10, the radial zone width of the distance portion curved surfaces $F_1$, $F_2$, ... and the radial zone width of the near portion curved surfaces $N_1$, $N_2$, ... change in the radial direction of the lens. In this case, the ratios $F_1 / N_1$, $F_2 / N_2$, ... of the radial zone width of the distance portion curved surfaces to the radial zone width of the near portion curved surfaces also change in the radial direction of the lens. In more detail, in the case of the contact lens shown in FIG. 9, the ratios decrease in the lens radial direction; and in the case of the contact lens shown in FIG. 10, the ratios increases in the lens radial direction. Accordingly, in the case where the contact lens as shown in FIG. 9 or 10 is used, whenever the pupil diameter changes, the ratio of the distance portions to the near portion contributing to the pupil changes. As already explained, since the pupil diameter changes according to the environment in which the contact lens is used, when the contact lens as shown in FIGS. 9 or 10 (the ratio of the radial zone width of the distance portion curved surfaces to that of the near portion curved surfaces changes in the lens radial direction) is used, it is possible to select the contact lens usable more comfortably according to the user' environments, for instance such as for indoor use or outdoor use.

Figure 11:
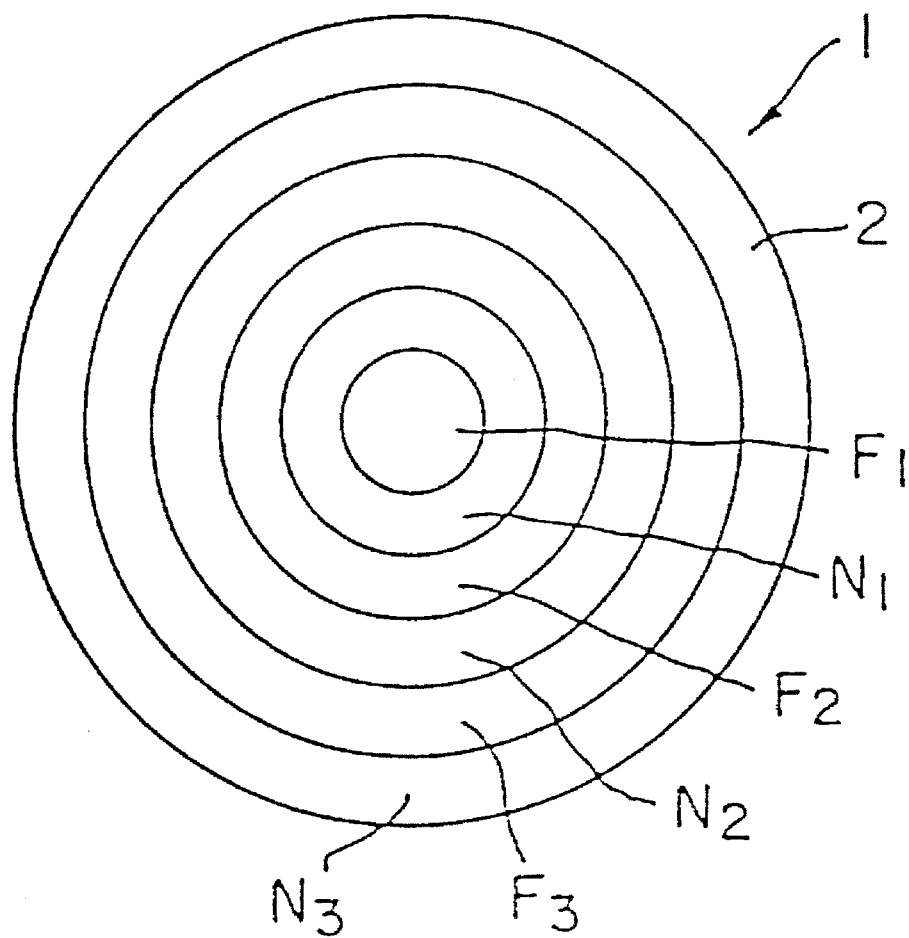
FIG. 11 is a plane view showing a fifth embodiment of the contact lens according to the present invention.

A fifth embodiment of the present invention will be described hereinbelow with reference to FIG. 11. In this embodiment, the radial zone widths of the respective distance portion curved surfaces $F_1$, $F_2$, ... are roughly equal to each other, and further the radial zone widths of the respective near portion curved surfaces $N_1$, $N_2$, ... are roughly equal to each other.

This fifth embodiment provides both the feature of the second embodiment such that the peripheral field of vision is wide and the feature of the third embodiment such that the clear eyesight can be obtained; that is, an intermediate characteristics between the two embodiments can be obtained.

Figure 12:
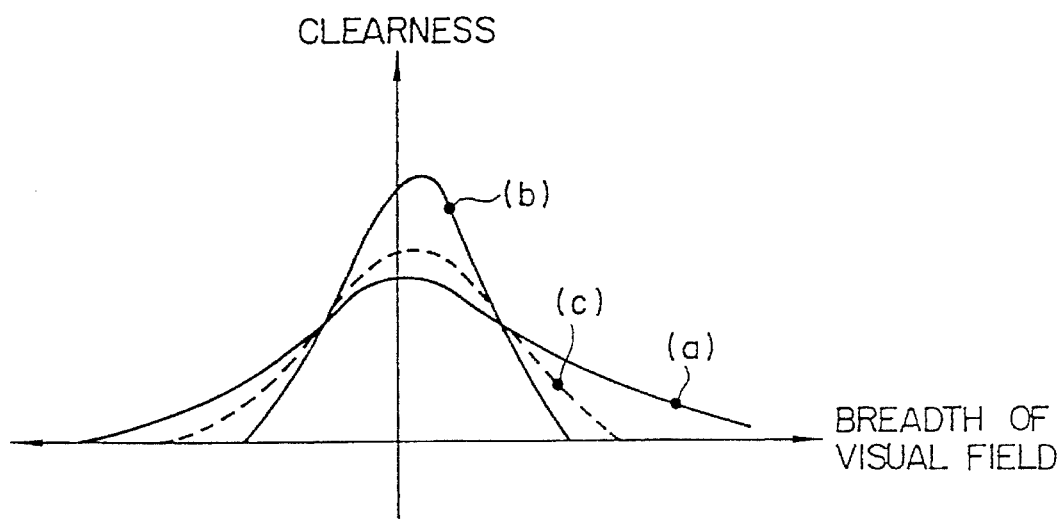
FIG. 12 is a graphical representation showing the conceptional comparative relationship among the second embodiment (A), the third embodiment (B) and the fifth embodiment (C)

FIG. 12 shows the conceptual characteristics of the second embodiment (a), the third embodiment (b) and the fifth embodiment (c), respectively. Further, in the embodiments shown in FIGS. 7 to 11, although only several distance portion curved surfaces $F_1$, $F_2$, ... and only several near portion curved surfaces $N_1$, $N_2$, ... are shown, about 5 to 30 curved surfaces are formed in practice, respectively.

Further, the second to fifth embodiments relate to only the relationship between the respective radial widths of the respective distance portion curved surfaces $F_1$, $F_2$, ... or only the relationship between the respective radial widths of the respective near portion curved surfaces $N_1$, $N_2$, .... In other words, the relationship between the radial zone widths of the respective distance portion curved surfaces $F_1$, $F_2$, ... and the radial zone widths of the respective near portion curved surfaces $N_1$, $N_2$, ... are not defined. In other words, there exists no problem even if the radial widths of both the distance and near portions are equal to each other or not equal to each other.

Further, nothing has been defined with respect to the area of the respective distance and near portion curved surfaces. It is possible to determined the sum total of the distance portion area to be equal to that of the near portion area. In this case, the brightness can be made roughly equal to each other between the distance and near portions.

Further, in the above-mentioned embodiments, the innermost zone is formed by the distance portion curved surface $F_1$. Without being limited thereto, however, it is possible to form the innermost zone by the near portion curved surface $N_1$.

A sixth embodiment of the contact lens according to the present invention will be described hereinbelow with reference to FIGS. 14 and 15. In the same way as with the case of the conventional contact lens, the contact lens 1 is formed with a front curve 2 and a base curve 3 fitted to a curved surface of the user' cornea. The front curve 2 is formed with a plurality of distance portion curved surfaces $F_1$, $F_2$, ... and a plurality of near portion curved surfaces $N_1$, $N_2$, .... These distance and near portion curved surfaces are arranged alternately and repeatedly in concentric zone shape.

In this embodiment, the ratio of energy transmitted through the distance portion curved surfaces $F_1$, $F_2$, ... to the energy transmitted through the near portion curved surfaces $N_1$, $N_2$, .... is determined to be different on the basis of the lens specifications, for instance such as for indoor use or outdoor use.

Figure 14A:
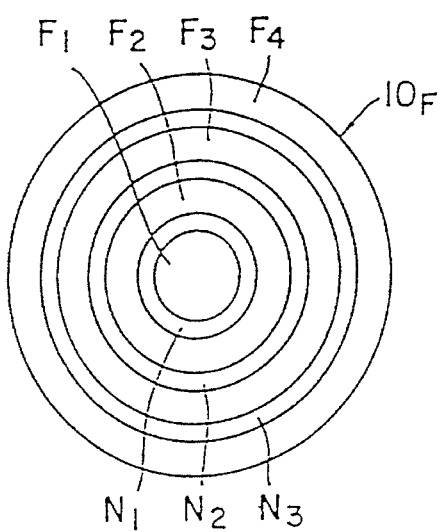
FIGS. 14(A) and (B) are plan views showing a sixth embodiment of the contact lens according to the present invention, in which (A) is suitable for outdoor use and (B) is suitable for indoor use.
Figure 14B:
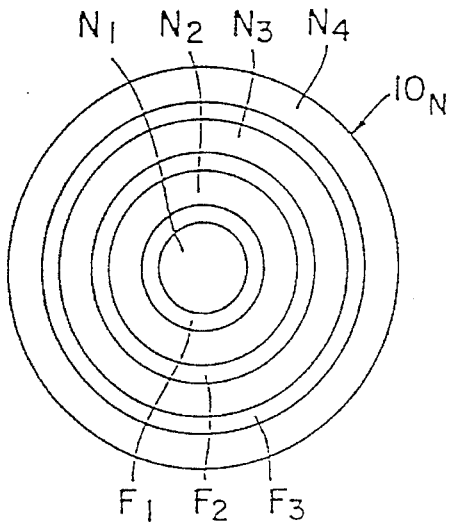

This energy ratio can be determined on the basis of the ratio of the total area of the distance portion curved surfaces $F_1$, $F_2$, ... to the total area of the near portion curved surfaces $N_1$, $N_2$, ..., for instance. In the case of the outdoor contact lens 10F as shown in FIG. 14(A), the ratio of the total area of the distance portion curved surfaces $F_1$, $F_2$, ... to the total area of the near portion curved surfaces $N_1$, $N_2$, ... lies within a range from 7:3 to 8:2. In the case of the indoor contact lens 10N as shown in FIG. 14(B), the same ratio lies within a range reciprocal to the above. Further, it is possible to obtain the above-mentioned energy ratio on the basis of the ratio of the quantity of light transmitted through the respective distance and near portions, without depending upon the ratio in area.

Figure 15:
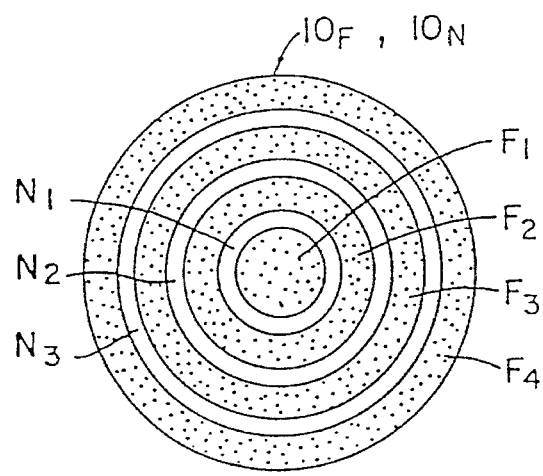
FIG. 15 is a plane view showing a modification of the sixth embodiment of the contact lens according to the present invention.

In the outdoor contact lens $10_F$, it is possible to tint only the distance portion curved surfaces $F_1, F_2, \ldots$ as a sun glass, as shown in FIG. 15.

Accordingly, as the contact lens suitable for the indoor use for book reading or desk work, it is preferable to use the contact lens $10_N$ with a large energy ratio in the near portion curved surfaces $N_1, N_2, \ldots$, because a near object can be seen easily through the near portion curved surfaces and further a distant object can be seen through the distance portion curved surfaces. On the other hands, as the contact lens suitable for the outdoor use for sports watching or car driving, it is preferable to use the contact lens $10_F$ with a large energy ratio in the distance portion curved surfaces $N_1, N_2, \ldots$, because a distant object can be seen easily through the distance portion curved surfaces and further a near object can be seen through the near portion curved surfaces. Further, when the distance portion curved surfaces $F_1, F_2, \ldots$ are tinted, since ultraviolet rays can be cut off by the tinted distance portions, it is possible to provide a more clear eyesight through the near portions in indoor use.

In addition, when the spherical aberration is removed from the distance and near portions of the contact lenses $10_F$ and $10_N$ as described in the first embodiment, it is possible to provide a contact lens more easy to see.

As described above, in the above-mentioned embodiments, it is possible to realize a contact lens provided with the performance nearly equivalent to a single vision lens and additionally the functions of both the distance and near portions when the contact lens is used properly according to the user' purpose such as indoor use, outdoor use, etc.; that is, according to various purposes. Further, when the spherical aberration is removed, it is possible to realize a contact lens further easy to see. Further, when the distance portions are colored, it is possible to provide a contact lens which functions as a sun glass in outdoor use and provides a more clear eyesight in indoor use by cutting off light coming from distant positions.

An embodiment of the method of manufacturing the contact lens according to the present invention will be described hereinbelow with reference to FIGS. 16 and 17.

The method of manufacturing a contact lens with the use of a soft polishing cloth is disclosed in Japanese Published Unexamined (Kokai) Patent Application No. 2-83153. In this embodiment, the method of manufacturing the contact lens as disclosed in the above-mentioned document is applied to the contact lens 1 provided with a front curve 2 formed with a plurality of distance portion curved surfaces and a plurality of near portion curved surfaces arranged alternately and repeatedly in concentric zone shape.

Figure 16:
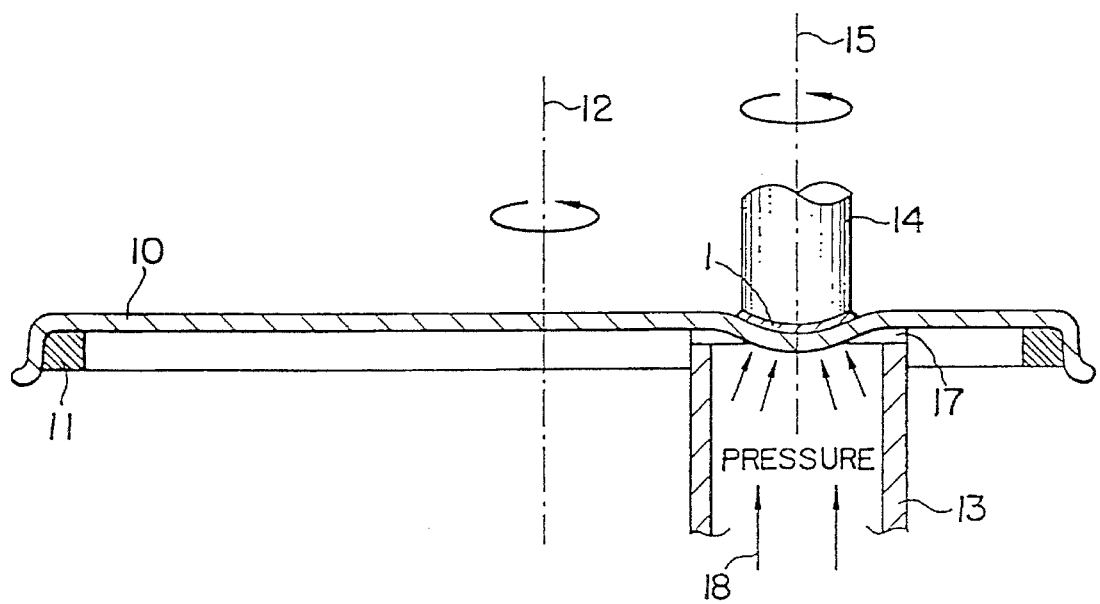
FIG. 16 is a cross-sectional view showing an embodiment of the method of manufacturing the contact lens according to the present invention.

In more detail, in FIG. 16, a soft polishing cloth is attached onto a rotatable table 11. The rotatable table 11 can rotate about a central axle 12 of the rotating polishing cloth, and the polishing cloth 10 rotates together with the rotatable table 11. A nozzle 13 is disposed below the rotatable table 11 in such a way that the upper portion of the nozzle 13 is covered with a part of the polishing cloth 10. Further, a fixture tool 14 is disposed over the nozzle 13. This tool 14 rotates about a central axle 15 of the rotating fixture tool 14.

Figure 17:
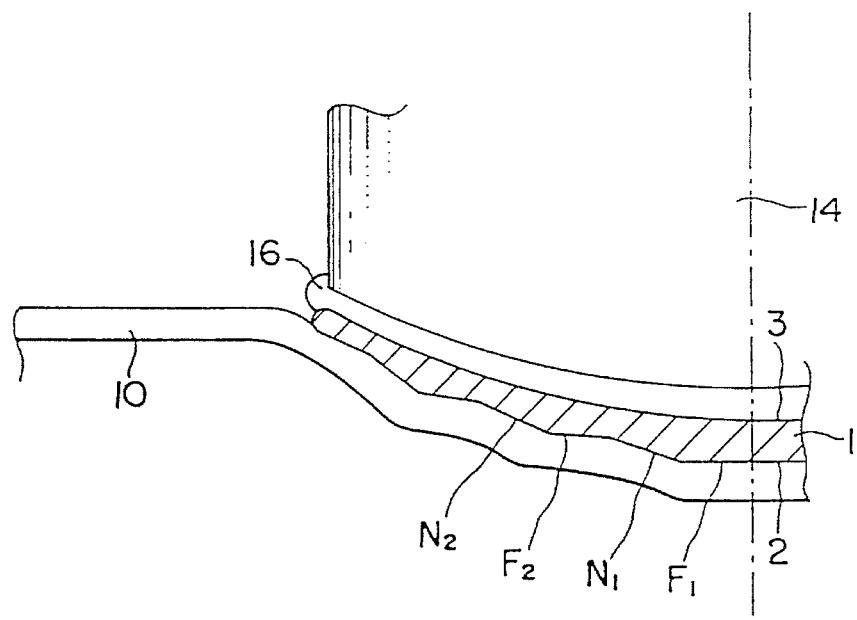
FIG. 17 is an enlarge view showing an essential portion shown in FIG. 16.

As depicted in more detail in FIG. 17, a contact lens 1 to be polished is supported on the bottom surface of the fixture tool 14 with a bonding agent attached to the base curve 3.

Further, a compressed air 18 is allowed to flow from below to above within the nozzle 13, so that the polishing cloth 10 covering the nozzle 13 is blown in the upward direction by the hydraulic pressure of the compressed air flowing through the nozzle 13. Accordingly, the polishing cloth 10 is brought into pressure contact with the front curve 2 of the contact lens 1. An abrasive powder of $Al_2O_3$ dispersed in water or oil is supplied between the front curve 2 and the polishing cloth 10. As the polishing cloth 10, a polishing cloth now on the market such as a polishing cloth lined with polyurethane can be used, for instance.

Further, the inner diameter of the nozzle 13 is determined to be larger than the outer diameter of the front curve 2, and the hydraulic pressure is kept at a constant value at the peripheral portion of the front curve 2 so that a uniform contact pressure can be obtained all over the front curve 2.

When the central axle 12 of the polishing cloth 10 and the central axle 15 of the fixture tool 14 rotate, the front curve 2 and the polishing cloth 10 are moved relative to each other so that the front curve 2 is polished.

The manufacturing process of the contact lens 1 other than the above-mentioned polishing process is almost the same as the conventional process.

In the manufacturing method of the present embodiment, a soft polishing cloth 10 is brought into pressure contact with the front curve 2 by pressure of air 18 and further the front curve 2 is moved relative to the polishing cloth 10 in order to polish the front curve 2. Therefore, since the polishing cloth 10 is allowed to follow softly the curved surfaces of the front curve 2, it is possible to polish the contact lens 1 uniformly including the adjoining portions between the distance portion curved surfaces $F_1, F_2, \ldots$ and the near portion curved surfaces $N_1, N_2, \ldots$.

A molding die for molding the contact lens of the present invention will be described hereinbelow with reference to FIGS. 18 to 20.

Figure 18:
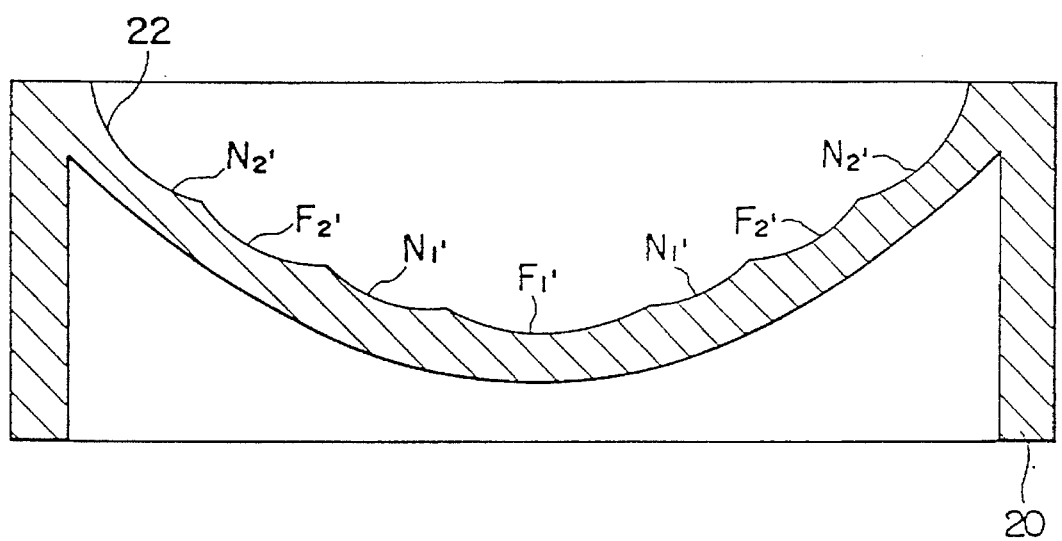
FIG. 18 is a cross-sectional view showing a molding die for molding the contact lens according to the present invention.

In FIG. 18, a contact lens molding die 20 is formed with a front curve molding die surface 22 corresponding to the front curve 2 of the contact lens 1. That is, the front curve molding die surface 22 is formed with distance portion die curved surfaces $F_1', F_2', \ldots$ and the near portion die curved surfaces $N_1', N_2', \ldots$ corresponding to the convex and concave relationship with respect to the distance portion curved surfaces $F_1, F_2$, and the near portion curved surfaces $N_1, N_2, \ldots$, respectively. The distance portion die curved surfaces $F_1', F_2', \ldots$ and the near portion die curved surfaces $N_1', N_2', \ldots$ are determined in accordance with the ray tracing method in the same way as in the first embodiment. In practice, the shapes of the distance portion curved surfaces $F_1, F_2, \ldots$ and the near portion curved surfaces $N_1, N_2, \ldots$ of the contact lens 1 are first obtained in accordance with the ray tracing method, and then the die curved surfaces related to these curved surfaces are determined.

Further, in FIG. 18, although only several distance portion die curved surfaces $F_1', F_2', \ldots$ and only several near portion die curved surfaces $N_1', N_2', \ldots$ are shown, 5 to 30 curved surfaces are formed in practice, respectively.

The method of manufacturing the contact lens with the use of the contact lens molding die 20 will be described hereinbelow with reference to FIGS. 19(A) and (B).

Figure 19A:
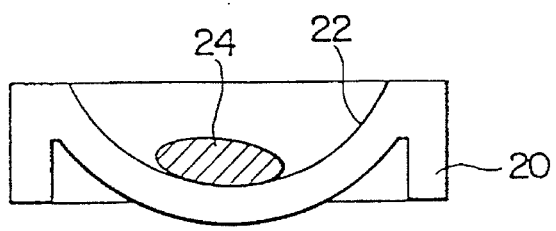
FIGS. 19(A) and (B) are illustrations for assistance in explaining a method of manufacturing the contact lens with the use of the contact lens molding die according to the present invention.
Figure 19B:
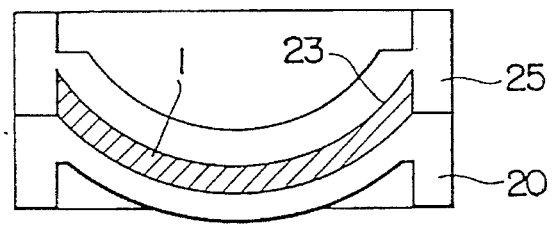

As shown in FIG. 19(A), a raw lens material 24 is placed on the front curve molding die surface 22 formed with distance portion die curved surfaces $F_1', F_2', \ldots$ and the near portion die curved surfaces $N_1', N_2', \ldots$ Thereafter, as shown in FIG. 19(B), a base curve molding die 25 formed with a base curve molding die surface 23 corresponding to the convex and concave relationship with respect to the base curve 3 is joined with the front curve molding die 20 at a predetermined positional relationship between the base curve molding die surface 23 and the front curve molding die surface 22. Under these conditions, both the molding dies 20 and 22 are heated by ultraviolet rays or heat to polymerize the lens material 24. Further, the space between the front curve molding die surface 22 and the base curve molding die surface 23 is so determined as to form a desired contact lens.

Another method of manufacturing the contact lens with the use of the contact lens molding die 20 will be described hereinbelow with reference to FIGS. 20(A) and (B).

Figure 20A:
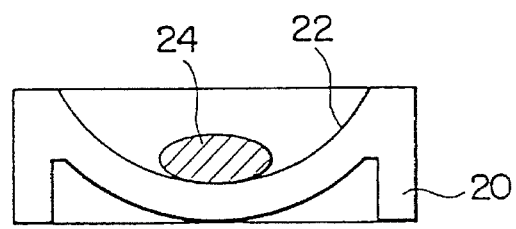
FIGS. 20(A) and (B) are illustrations for assistance in explaining another method of manufacturing the contact lens with the use of the contact lens molding die according to the present invention.
Figure 20B:
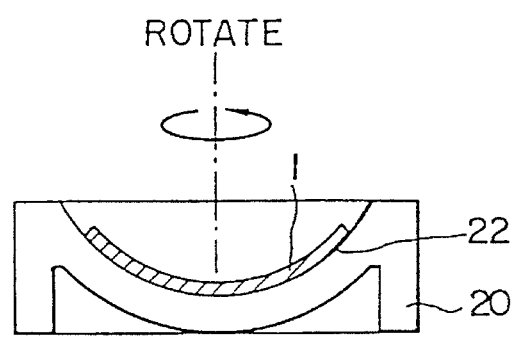

As shown in FIG. 20(A), a raw lens material 24 is placed on the front curve molding die surface 22 formed with distance portion die curved surfaces $F_1'$, $F_2'$, and the near portion die curved surfaces $N_1'$, $N_2'$, Thereafter, as shown in FIG. 20(B), the contact lens molding die 20 is rotated. The base curve 2 is formed by controlling the rotational speed of the contact lens molding die 20. Further, it is also possible to form the base curve by cutting the contact lens with a lathe, for instance.

In the method of manufacturing the contact lens according to the present invention, since the front curve molding die surface 22 of the contact lens molding die 20 is formed with distance portion die curved surfaces $F_1'$, $F_2'$, .. and the near portion die curved surfaces $N_1'$, $N_2'$, ... corresponding to the convex and concave relationship with respect to the distance portion curved surfaces $F_1$, $F_2$, . . . and the near portion curved surfaces $N_1$, $N_2$, . . . , respectively, it is possible to manufacture the contact lens formed with the distance portions and the near portions from which spherical aberration can removed with the use of the contact lens molding die 20.

What is claimed is:

1. A contact lens provided with a front curve formed with a plurality of distance portion curved surfaces for seeing a distant place and a plurality of near portion curved surfaces for seeing a near place arranged alternately and repeatedly in concentric zone shape, wherein:

the distance portion curved surfaces formed at least a central zone of the front curve have respective curvature centers positioned increasing distance away from an optical axis and the front curve of the contact lens respectively, as the distance portion curved surfaces are located increasing distance away from the optical axis, and further the curvature centers of the distance portion curved surfaces are so arranged that light rays parallel to the optical axis and allowed to be incident upon the distance portion curved surfaces are focused at roughly the same point on the optical axis; and the near portion curved surfaces formed at least the central zone of the front curve have respective curvature centers positioned increasing distance away from the optical axis and decreasing distance close to the front curve of the contact lens respectively, as the near portion curved surfaces are located increasing distance away from the optical axis, and further the curvature centers of the near portion curved surfaces are so arranged that light rays parallel to the optical axis and allowed to be incident upon the near portion curved surfaces are focused at roughly the same point on the optical axis.

2. A contact lens according to claim 1, wherein respective radial zone widths of the distance portion curved surfaces change according to distance between the distance portion curved surface and an optical axis of the contact lens; and respective radial zone widths of the near portion curved surfaces change according to distance between the near portion curved surface and the optical axis of the contact lens.

3. The contact lens of claim 2, wherein the respective radial zone widths of the distance portion curved surfaces increase with increasing distance between the distance portion curved surface and the optical axis of the contact lens; and respective radial zone widths of the near portion curved surface increase with increasing distance between the near portion curved surface and the optical axis of the contact lens.

4. The contact lens of claim 2, wherein the respective radial zone widths of the distance portion curved surfaces decrease with increasing distance between the distance portion curved surface and the optical axis of the contact lens; and respective radial zone widths of the near portion curved surface decrease with increasing distance between the near portion curved surface and the optical axis of the contact lens.

5. The contact lens of claim 3, wherein the respective radial zone widths of the distance portion curved surfaces decrease or increase with increasing distance between the distance portion curved surface and the optical axis of the contact lens; and respective radial zone widths of the near portion curved surface increase or decrease with increasing distance between the near portion curved surface and the optical axis of the contact lens.

6. A contact lens according to claim 1 wherein respective radial zone widths of the distance portion curved surfaces are roughly equal to each other; and respective radial zone widths of the near portion curved surfaces are roughly equal to each other.

7. A contact lens according to claim 1 wherein energy ratio of the distance portion curved surfaces to the near portion curved surfaces is determined on the basis of a rate according to outdoor use and indoor use.

8. The contact lens of claim 7, wherein the energy ratio is a ratio in area of the distance portion curved surfaces to the near portion curved surfaces.

9. The contact lens of claim 7, wherein the energy ratio is a ratio in luminous energy of light passed through the distance portion curved surfaces to the near portion curved surfaces.

10. The contact lens of claim 7, wherein the distance portion curved surfaces formed at least a central zone of the front curve have respective curvature centers positioned increasing distance away from an optical axis and the front curve of the contact lens respectively, as the distance portion curved surfaces are located increasing distance away from the optical axis, and further the curvature centers of the distance portion curved surfaces are so arranged that light rays parallel to the optical axis and allowed to be incident upon the distance portion curved surfaces are focused at roughly the same point on the optical axis; and the near portion curved surfaces formed at least the central zone of the front curve have respective curvature centers positioned increasing distance away from the optical axis and decreasing distance close to the front curve of the contact lens respectively, as the near portion curved surfaces are located increasing distance away from the optical axis, and further the curvature centers of the near portion curved surfaces are so arranged that light rays parallel to the optical axis and allowed to be incident upon the near portion curved surfaces are focused at roughly the same point on the optical axis.

11. The contact lens of claim 7, wherein the distance portion curved surfaces for seeing a distant place are tinted.

12. The contact lens of claim 7, wherein the energy ratio exists in a range of 7:3–8:2.

13. The contact lens of claim 7, wherein the energy ratio exists in a range of 3:7–2:8.

14. A contact lens provided with a front curve formed with a plurality of distance portion curved surfaces for seeing a distant place and a plurality of near portion curved surfaces for seeing a near place arranged alternately and repeatedly in concentric zone shape, wherein:

the distance portion curved surfaces formed at a central zone of the front curve have respective curvature centers positioned increasing distances away from an optical axis and the front curve of the contact lens respectively, and the distance portion curved surfaces formed radially outside the central zone of the front curve have respective curvature centers positioned increasing distance away from the optical axis and decreasing distance close to the front curve of the contact lens respectively, as the distance portion curved surfaces are located increasing distance away from the optical axis, and further the curvature centers of the distance portion curved surfaces are so arranged that light rays parallel to the optical axis and allowed to be incident upon the distance portion curved surfaces are focused at roughly the same point on the optical axis; and the near portion curved surfaces formed at the central zone of the front curve have respective curvature centers positioned increasing distance away from the optical axis and decreasing distance close to the front curve of the contact lens respectively, and the near portion curved surfaces formed radially outside the central zone of the front curve have respective curvature centers positioned increasing distances away from the optical axis and the front curve of the contact lens respectively, as the near portion curved surfaces are located increasing distance away from the optical axis, and further the curvature centers of the near portion curved surfaces are so arranged that light rays parallel to the optical axis and allowed to be incident upon the near portion curved surfaces are focused at roughly the same point on the optical axis.

15. A molding die for a contact lens provided with a front curve formed with a plurality of distance portion curved surfaces for seeing a distant place and a plurality of near portion curved surfaces for seeing a near place arranged alternately and repeatedly in concentric zone shape, wherein the molding die is formed with a contact lens forming surface such that the distance portion curved surfaces formed at least a central zone of the front curve have respective curvature centers positioned increasing distance away from an optical axis and the front curve of the contact lens respectively, as the distance portion curved surfaces are located increasing distance away from the optical axis, and further the curvature centers of the distance portion curved surfaces are so arranged that light rays parallel to the optical axis and allowed to be incident upon the distance portion curved surfaces are focused at roughly the same point on the optical axis; and the near portion curved surfaces formed at least the central zone of the front curve have respective curvature centers positioned increasing distance away from the optical axis and decreasing distance close to the front curve of the contact lens respectively, as the near portion curved surfaces are located increasing distance away from the optical axis, and further the curvature centers of the near portion curved surfaces are so arranged that light rays parallel to the optical axis and allowed to be incident upon the near portion curved surfaces are focused at roughly the same point on the optical axis.

16. A method of manufacturing a contact lens provided with a front curve formed with a plurality of distance portion curved surfaces for seeing a distant place and a plurality of near portion curved surfaces for seeing a near place arranged alternately and repeatedly in concentric zone shape, wherein:

the distance portion curved surfaces formed at least a central zone of the front curve have respective curvature centers positioned increasing distance away from an optical axis end the front curve of the contact lens respectively, as the distance portion curved surfaces ere located increasing distance away from the optical axis, and further the curvature centers of the distance portion curved surfaces ere so arranged that light rays parallel to the optical axis and allowed to be incident upon the distance portion curved surfaces are focused at roughly the same point on the optical axis; and the near portion curved surfaces formed at least the central zone of the front curve have respective curvature centers positioned increasing distance away from the optical axis and decreasing distance close to the front curve of the contact lens respectively, as the near portion curved surfaces are located increasing distance away from the optical axis, and further the curvature centers of the near portion curved surfaces are so arranged that light rays parallel to the optical axis and allowed to be incident upon the near portion curved surfaces ere focused at roughly the same point on the optical axis, wherein a soft polishing cloth is brought into pressure contact with the front curve of the contact lens by hydraulic pressure, and the front curve and the polishing cloth are moved relative to each other to polish the front curve.

* * * * *